US005742847A

United States Patent [19]
Knoll et al.

[11] Patent Number: 5,742,847
[45] Date of Patent: Apr. 21, 1998

[54] M&A FOR DYNAMICALLY GENERATING AND MAINTAINING FRAME BASED POLLING SCHEDULES FOR POLLING ISOCHRONOUS AND ASYNCHRONOUS FUNCTIONS THAT GUARANTY LATENCIES AND BANDWIDTHS TO THE ISOCHRONOUS FUNCTIONS

[75] Inventors: Shaun Knoll, Portland, Oreg.; Jeff Charles Morriss, Boulder Creek, Calif.; Ajay V. Bhatt, El Dorado Hills, Calif.; Puthiya Kottal Nizar, El Dorado Hills, Calif.; Richard M. Haslam, Hillsboro; Sudarshan Bala Cadambi, Portland, both of Oreg.

[73] Assignee: Intel Corporation, Santa Clara, Calif.

[21] Appl. No.: 331,727

[22] Filed: Oct. 31, 1994

[51] Int. Cl.$^6$ .......................... G06F 13/14; G06F 13/20; G06F 13/22
[52] U.S. Cl. .......................... 395/866; 395/836; 395/861; 370/95.1; 370/95.2
[58] Field of Search .......................... 395/835, 849, 395/850, 836, 200.17, 860, 861, 864, 865, 866; 370/60, 60.1, 85.8, 94.2, 95.1, 95.2

[56] References Cited

U.S. PATENT DOCUMENTS

| 3,245,045 | 4/1966 | Randlev | 395/800 |
|---|---|---|---|
| 3,916,387 | 10/1975 | Woodrum | 395/800 |
| 3,932,841 | 1/1976 | Deerfield et al. | 395/287 |
| 4,070,704 | 1/1978 | Calle et al. | 395/700 |
| 4,092,491 | 5/1978 | Frazer | 375/283 |
| 4,409,656 | 10/1983 | Andersen et al. | 331/40 |
| 4,606,052 | 8/1986 | Hirzel et al. | 375/333 |
| 4,660,141 | 4/1987 | Ceccon et al. | 395/829 |
| 4,689,740 | 8/1987 | Moelands et al. | 364/200 |
| 4,713,834 | 12/1987 | Brahm et al. | 379/28 |
| 4,748,346 | 5/1988 | Emori | 326/90 |
| 4,870,704 | 9/1989 | Matelan et al. | 395/800 |

(List continued on next page.)

OTHER PUBLICATIONS

Philips's I C (Inter-Integrated Circuit) Bus, 5 pages.
Concentration Highway Interface (CHI), AT&T Microelectronics Interface Specification, Nov. 1990 (DS90-124SMOS).
ATA/ANSI 878.1, Version 1.9 (59 Sheets), Copyright 1992 ARCNET Trade Association.
PCMCIA PC Card Standard, Release 2.01, 1.1-4.8.9, Copright 1992 PCMCIA.
ACCESS.bus™ Specifications—Version 2.2.
High Performance Serial Bus, P1394/Draft 6.2v0, Copyright 1993 IEEE.

(List continued on next page.)

*Primary Examiner*—Thomas C. Lee
*Assistant Examiner*—D. Dinh
*Attorney, Agent, or Firm*—Blakely, Sokoloff, Taylor & Zafman

[57] ABSTRACT

Circuitry and complementary logic are provided to a bus controller, a number of 1:n bus signal distributors, and a number of bus interfaces of an hierarchical serial bus assembly for the bus controller to dynamically generate and maintain a frame based polling schedule for polling the functions of the bus agents connected to the serial bus assembly and the serial bus elements themselves. The hierarchical serial bus assembly is used to serially interface a number of isochronous and asynchronous peripherals to the system unit of a computer system. These circuitry and complementary logic of the serial bus elements support gathering of various critical operating characteristics by the bus controller. The circuitry and logic provided to the bus controller in turn generate the frame based polling schedule in accordance to these gathered critical operating characteristics, guaranteeing latencies and bandwidths to the isochronous functions of the isochronous peripherals. In certain embodiments, the circuitry and logic provided to the bus controller further adapts in real time its frame based polling schedule in like manner, responsive to live attachment/detachment of serial bus elements.

20 Claims, 25 Drawing Sheets

U.S. PATENT DOCUMENTS

| | | | |
|---|---|---|---|
| 4,885,742 | 12/1989 | Yano | 370/85.2 |
| 4,912,633 | 3/1990 | Schweizer et al. | 395/800 |
| 4,914,650 | 4/1990 | Sriram | 370/60 |
| 4,984,190 | 1/1991 | Katori et al. | 395/200.05 |
| 5,001,707 | 3/1991 | Kositpaiboon et al. | 370/94.1 |
| 5,063,574 | 11/1991 | Moose | 375/244 |
| 5,130,983 | 7/1992 | Heffner, III | 370/85.8 |
| 5,173,939 | 12/1992 | Abadi et al. | 380/25 |
| 5,179,670 | 1/1993 | Farmwald et al. | 395/282 |
| 5,208,807 | 5/1993 | Gass et al. | 370/60.1 |
| 5,237,690 | 8/1993 | Bealkowski et al. | 395/700 |
| 5,257,160 | 10/1993 | Yokohama et al. | 361/246 |
| 5,269,011 | 12/1993 | Yanai et al. | 395/280 |
| 5,282,202 | 1/1994 | Bernstein et al. | 370/94.1 |
| 5,317,597 | 5/1994 | Eisele | 375/257 |
| 5,341,131 | 8/1994 | Hoshino et al. | 340/825.21 |
| 5,341,480 | 8/1994 | Wasseman et al. | 395/287 |
| 5,361,261 | 11/1994 | Edem et al. | 370/85.3 |
| 5,379,384 | 1/1995 | Solomon | 395/308 |
| 5,386,567 | 1/1995 | Lien et al. | 395/700 |
| 5,394,556 | 2/1995 | Oprescu | 395/800 |
| 5,418,478 | 5/1995 | Van Brunt et al. | 326/86 |
| 5,440,181 | 8/1995 | Gruender, Jr. et al. | 307/156 |
| 5,440,556 | 8/1995 | Edem et al. | 370/79 |
| 5,446,765 | 8/1995 | Leger | 375/359 |
| 5,463,620 | 10/1995 | Sriram | 370/60 |
| 5,463,624 | 10/1995 | Hogg et al. | 370/85.6 |
| 5,483,518 | 1/1996 | Whetsel | 370/13 |
| 5,528,513 | 6/1996 | Vaitzblit et al. | 365/514 |

OTHER PUBLICATIONS

GLOBECOM'92: IEEE Global Telecommunications Conference; Sriram Methodologies For Bandwidth Allocation, Transmission Scheduling, and Congestion Avoidance In Broadband ATM.

GLOBECOM'90: IEEE Global Telecommunications Conference; Aicardi, et al. "Adaptive Bandwidth Assignments in a TDM Network With Hybrid Frames", pp. 41–42.

Local Computer Networks, 1991 6th Conference, Issued 13 Mar. 1991, R. Bolla et al, "A traffic control strategy for a DQDB-type MAN", pp. 195–196.

Wireless Communications, Selected Topics, Int'l. conference 1992, Issued FEb. 1992, K. S. Natarajan, "A hybrid medium access Protocol for Wireless LANS", pp. 134–136.

IEEE Transactions on Communications, Z. Zhang et al, Bounds on the mean system–size and Delay for a movable–boundary integrated circuit and packet switched communications.

GLOBECOM'92: IEEE Global Telecommunications Conference; Bolla et al. "A Neutral Strategy For Optimal Multiplexing Of Circuit-and Packet-Switched Traffic." 1992 pgs.

Exemplary Usage Model

- Topology: Host, 1 Hub, 4 Nodes, 5 Functions

- 1 CD - Audio @ 44 khz
  - 1 ISDN Channel @ 192 kbps
  - 1 Voice Channel @ 176 kbps
  - 2 Async Channels (Mouse/Keyboard)

- Requirements

| Transfer | Queue Depth | Data Rate | Latency | Transmit Time |
|---|---|---|---|---|
| CD - Audio | 64 bytes | 1.408 mbps | 2.75 khz (364 us) | 114 us |
| ISDN 1 | 16 bytes | 192 kbps | 1.5 kltz (667 us) | 37.1 us |
| Voice | 16 bytes | 176 kbps | 1.375 lhz (727 us) | 37.1 us |
| Keyboard | 32 bytes | Async | 100 ms | 62.8 us |
| Mouse | 32 bytes | Async | ·100 ms | 62.8 us |
| GEO Poll | Hub - 8 bytes Node - 4 bytes | Async | N/A | 28.4 us-hub 21.8 us - node |
| Alt. Req. | None | Async | N/A | 8 us each |
| Mgmt. Query | CMD - 4 bytes Resp - 9 bytes | Async | N/A | 18.4 us - Tx 26.4 us - Rx |

M&A FOR DYNAMICALLY GENERATING AND MAINTAINING FRAME BASED POLLING SCHEDULES FOR POLLING ISOCHRONOUS AND ASYNCHRONOUS FUNCTIONS THAT GUARANTY LATENCIES AND BANDWIDTHS TO THE ISOCHRONOUS FUNCTIONS

BACKGROUND OF THE INVENTION

1. Field of the Invention

The present invention relates to the field of computer systems. More specifically, the present invention relates to serial buses for connecting peripherals to the system units of computer systems, including the associated controllers and interfaces.

2. Background Information

A number of interrelated considerations is making it desirable to have a single, relatively fast, bi-directional, isochronous, low-cost, and dynamically configurable serial bus for simultaneously connecting isochronous as well as asynchronous peripherals to the system unit of a desktop computer system. Isochronous peripherals are peripherals that generate real time natural data such as voice, motion video, and the like. These interrelated considerations include:

Connection of the Telephone to the Desktop Computer

It is expected that the merging of computing and communication will be the basis of the next generation of productivity applications on desktop computers. The movement of machine oriented and human oriented data types from one location or environment to another depends on ubiquitous and cheap connectivity. Unfortunately, the computing and communication industries have evolved independently. As a result, a wide range of desktop computer and telephone interconnects have to be supported.

Ease of Use

The lack of flexibility in reconfiguring desktop computers has been acknowledged as its Achilles heel to it's further development. The combination of user friendly graphical interfaces and the hardware and software mechanisms associated with the new generation of system bus architectures have made desktop computers less confrontational and easier to reconfigure. However, from the enduser point of view, the desktop computer's I/O interfaces such as serial/parallel ports, keyboard/mouse/joystick interfaces, still lack the attributes of plug and play or too limiting in terms of the type of I/O devices that can be live attached/detached.

Port Expansion

The addition of external peripherals to desktop computers continues to be constrained by port availability. The lack of a bi-directional, lowcost, low to mid speed peripheral bus has held back the proliferation of peripherals like telephone/fax/modem adapters, answering machines, scanners, personal digital assistants (PDA), keyboards, mouses, etc. Existing interconnects are optimized for one or two point products. As each new function or capability is added to the desktop computer, typically a new interface has been defined to address this need.

In other words, this desired serial bus is expected to provide low cost simultaneous connectivity for the relatively low speed 10–100 kbps interactive devices such as keyboard, mouse, stylus, game peripherals, virtual reality peripherals, and monitors, as well as the moderate speed 500–5000 kbps isochronous devices such as ISDN, PBX, POTS, and other audio devices. A multiplicity of both types of devices are expected to be connected and active at the same time, and yet the latter type of devices are provided with guaranteed latencies and bandwidths. Furthermore, the devices are expected to be hot attached and detached, with the serial interface being able to dynamically reconfigure itself without interrupting operation of the desktop computer system.

There are several technologies that are commonly considered to be serial buses for connecting peripherals to system units of computer systems. Each of these buses is designed to handle a specific range of communications between system units and peripherals. Particular examples of these buses include:

Apple® Desktop Bus (ADB): ADB is a proprietary bus of Apple Computer Inc. It is a minimalist serial bus that provides a simple read/write protocol to up to 16 devices. Only basic functions are required of the controller and interface hardware. Thus, the implementation cost is expected to be low. However, ADB supports data rates only up to 90 kbps, just enough to communicate with asynchronous desktop devices such as keyboards and mouses. It is not capable of simultaneously supporting the moderate speed isochronous devices discussed earlier.

Access.bus (A.b): A.b is developed by the Access.bus Industry Group. It is based on the $I^2C$ technology of Philips Corporation and a software model of Digital Equipment Corporation (DEC). A.b is also designed primarily for asynchronous devices such as keyboards and mouses. However A.b is generally considered to be more versatile than ADB. A.b's protocol has well defined specifications for dynamic attach, arbitration, data packets, configuration and software interface. Moderate amount of functions are required of the controller and interface hardware. Thus, the implementation cost is only marginally competitive for the desired desktop application. While addressing is provided for up to 127 devices, the practical loading is limited by cable lengths and power distribution considerations. Revision 2.2 specifies the bus for 100 kbps operation, but the technology has headroom to go up to 400 kbps using the same separate clock and data wires. However, at 400 kbps, A.b still falls short in meeting the requirements of the moderate speed isochronous devices.

IEEE's P1394 Serial Bus Specification (aka FireWire): FireWire is a high performance serial bus. It is designed primarily for hard disk and video peripherals, which may require bus bandwidth in excess of 100 Mbps. It's protocol supports both isochronous and asynchronous transfers over the same set of 4 signal wires, broken up as differential pairs of clock and data signals. Thus, it is capable of simultaneously meeting the requirements of low speed interactive as well as moderate speed isochronous devices. However, elaborate functions are required of the controller and interface hardware, rendering FireWire to be non-price competitive for the desired desktop application. Moreover, the first generation of devices, based on FireWire's specification, are only just becoming available in the market.

The Concentration Highway Interface (CHI): CHI is developed by American Telephone & Telegraph Corporation (AT&T) for terminals and digital switches. It is a full duplex time division multiplexed serial interface for digitized voice transfer in a communication system. The protocol consists of a number of fixed time slots that can carry voice data and control information. The current specification supports data transfer rates up to 4.096 Mbps. The CHI bus has 4 signal wires: Clock, Framing, Receive Data, and Transmit Data. Both, the Framing and the Clock signals are generated centrally (i.e. PBX switch). Thus, it is also capable of simultaneously meeting the requirements of low speed interactive as well as the moderate speed isochronous devices. Similar to FireWire, elaborate functions are also required of the controller and interface hardware. As a result, CHI is also non-price competitive for the desired desktop application.

As will be disclosed in more detail below, the present invention provides the desired serial bus assembly, including its associated controller, bridging connectors and interfaces, that advantageously overcomes the limitations of the prior art serial buses in a novel manner.

SUMMARY OF THE INVENTION

The present invention includes circuitry and complementary logic provided to a bus controller, a number of 1:n bus signal distributors, and a number of bus interfaces of an hierarchical serial bus assembly for the bus controller to dynamically generate and maintain a frame based polling schedule for polling the functions of the bus agents connected to the serial bus assembly and the serial bus elements themselves. The hierarchical serial bus assembly is used to serially interface a number of isochronous and asynchronous peripherals to the system unit of a computer system. These circuitry and complementary logic of the serial bus elements support gathering of various critical operating characteristics by the bus controller. The circuitry and logic provided to the bus controller in turn generate the frame based polling schedule in accordance to these gathered critical operating characteristics, guaranteeing latencies and bandwidths to the isochronous functions of the isochronous peripherals. In certain embodiments, the circuitry and logic provided to the bus controller further adapt in real time its frame based polling schedule in like manner, responsive to live attachment/detachment of serial bus elements.

Typically, the bus controller is disposed in the system unit, and interconnected to a number of 1:n bus signal distributors and a number of bus interfaces. The bus interfaces are disposed in the connecting peripherals, one bus interface per connecting peripheral. The peripherals, through their bus interfaces, are generally connected to the system unit, through the bus controller, using one or more of the bus signal distributors disposed in the system unit, stand alone bridging connectors and/or the connecting peripherals. A bus interface is always a termination point. Only a bus signal distributor may have one or more bus signal distributor(s) and/or bus interface(s) connected upstream to it. Together the system unit, the serial bus elements, and the peripherals form an hierarchy of interconnected devices.

A connecting peripheral may be an isochronous or an asynchronous peripheral. Typically, the isochronous peripherals operate with data rates in the range of 500–5000 kbps, whereas the asynchronous peripherals operate with data rates in the range of 10–100 kbps. Furthermore, a connecting peripheral may be a multi-function peripheral, i.e. multiple functions being mapped to a single bus connection point serviced by a single bus interface.

The bus controller, the bus signal distributors, and the bus interfaces jointly implement a master/slave model of flow control for serially interfacing the interconnected peripherals to the system unit to facilitate data communication transactions between the bus agents, and connection management transactions among the serial bus elements at the bus agents and the serial bus elements' respective operating speeds. Furthermore, these serial bus elements jointly implement a frame based polling schedule for polling the functions of the slave peripherals and the slave serial bus elements that guaranties the latencies and bandwidths of the isochronous functions. The frame based schedule, also referred to as a super frame, has a number of sub-schedules, also referred to as soft frames. An isochronous function is polled as frequent as it is necessary in one or more soft flames of the super frame to guarantee its latency and bandwidth. The rest of the pollings are scheduled around the polling of the isochronous functions, typically in at most one soft frame. During operation, the bus controller systematically polls the functions of the interconnected peripherals through their bus interfaces for data communication transactions, and the serial bus elements for connection management transactions in accordance to the polling schedule.

At power on or reset, the circuitry and complementary logic provided to the serial bus elements under the present invention jointly facilitate gathering by the bus controller latency requirements of isochronous functions, transmit times of their isochronous data, transactional requirements for asynchronous functions as well as connection management, and transmit times of these transactions. The circuitry and logic provided to the bus controller then determine the lowest latency requirement of the isochronous functions, and set the soft frame size to equal the lowest latency requirement of the isochronous functions. These circuitry and logic of the bus controller further determine an isochronous watermark delimiting the upper limit of a soft frame for polling isochronous functions to ensure the guaranties are met, as well as a frame watermark delimiting the upper limit of a soft frame for performing any kind of polling to ensure operational reliability.

In some embodiments, the circuitry and logic provided to the bus controller then schedule polling of as many isochronous functions as possible within each soft frame, for data communication transactions, subject to the constraint of the cumulated transmit times of their isochronous data being less than the isochronous watermark. Residual isochronous functions, if any, are rejected by the bus controller for exceeding bus capacity. Then, the circuitry and logic provided to the bus controller schedule polling of the asynchronous functions for data communication transactions, and the serial bus elements for connection management transactions, around the polling of the isochronous functions for data communication transactions, subject to the constraint of the cumulative transmit time of each soft frame being less than the frame watermark, using multiple soft frames if necessary.

In other embodiments, the circuitry and logic provided to the bus controller further determine the least common update rate required by the isochronous functions based on their respective update rate requirements. The update rate requirements are equal to the reciprocals of the respective latency requirements of the isochronous functions. Upon determining the least common update rate of the isochronous functions, the circuitry and logic provided to the bus controller further determine a multiplier for each isochronous function to multiplicatively expand the isochronous function's required update rate to the least common update rate. The circuitry and logic provided to the bus controller then schedule polling of the isochronous functions in multiple soft frames, for data communication transactions, based on truncated versions of these multipliers, and subject to the constraint of the cumulated transmit times of the isochronous data of each soft frame being less than the isochronous watermark. Similarly, residual isochronous functions, if any, are rejected by the bus controller as the earlier described approach. Polling of the asynchronous functions for data communication transactions, and the serial bus elements for connection management transactions, are scheduled around the polling of the isochronous functions for data communication transactions as the earlier described approach.

In some embodiments, the bus controller, the bus signal distributors, and the bus interfaces also jointly support having the bus controller dynamically detects live attachment/detachment of serial bus elements and dynamically manages the connection topology. For these embodiments, the circuitry and logic provided to the bus controller further adapt in real time the frame based polling schedule in like manner.

BRIEF DESCRIPTION OF DRAWINGS

The present invention will be described by way of exemplary embodiments, but not limitations, illustrated in the accompanying drawings in which like references denote similar elements, and in which:

FIGS 17a–17c, illustrate an exemplary application of the lowest latency method;

DETAILED DESCRIPTION

In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention.

Figure 1:
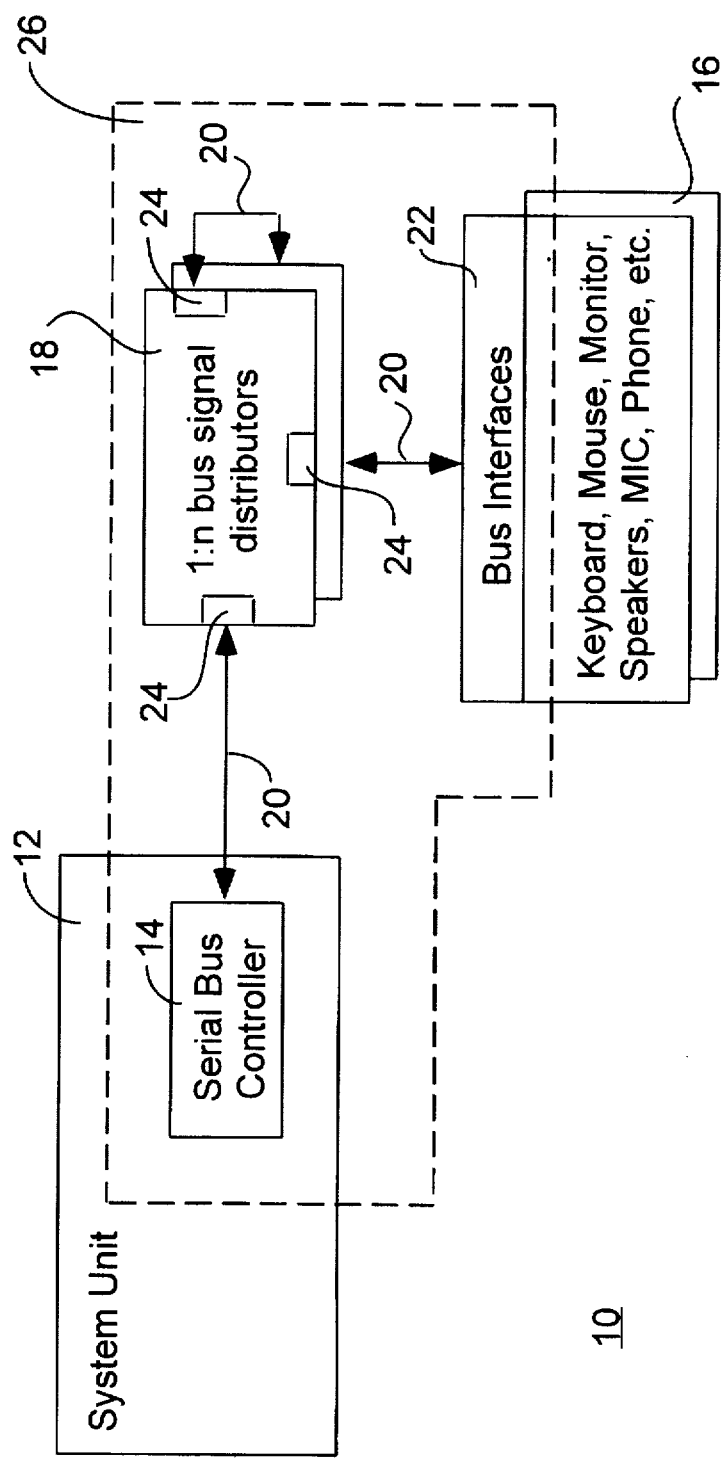
FIG. 1 illustrates an exemplary computer system incorporating the serial bus teachings of the present invention.

Hierarchical Serial Bus Assembly for Serially Interfacing Isochronous and Asynchronous Peripherals to a System Unit of a Computer System Referring now to FIG. 1, a block diagram illustrating an exemplary computer system incorporating the serial bus teachings of the present invention is shown. Exemplary computer system 10 comprises system unit 12 having serial bus controller 14 of the present invention, 1:n bus signal distributors 18 of the present invention, each having n+1 ports 24, and peripherals 16 having bus interfaces 22 of the present invention. Peripherals 16 are coupled to bus controller 14 of system unit 12 through 1:n bus signal distributors 18 and cables 20. Collectively, bus controller 14, bus signal distributors 18, bus interfaces 22, and cables 20 form a serial bus assembly 26 interconnecting bus agents, i.e. system unit 12 and peripherals 16 to each other.

Figure 7:
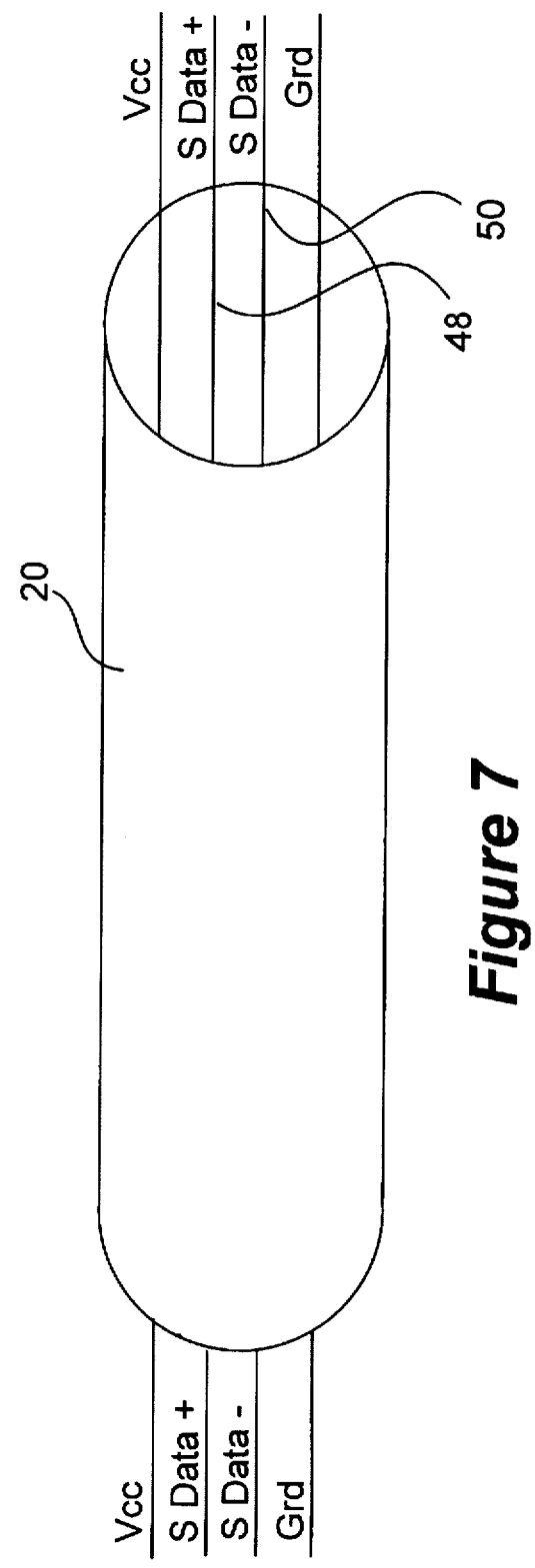
FIG. 7 illustrates one embodiment of the cables physically connecting the serial bus elements under the present invention.

Cables 20 are preferably low cost two signal wires cables 48 and 50 (as illustrated in FIG. 7). However, cable 20 are capable of supporting data transfer rates up to 5 Mbps. Furthermore, when such low cost cables 20 are employed, electrical signals are preferably propagated over the two signal wires 48 and 50 between the interconnected devices 14, 18 and 22 in a differential manner. For examples, a negative voltage differential represents a 1-bit and a positive voltage differential represents a 0-bit. For some embodiments, data and control states are further inferred from the electrical signals' voltage states and/or durations. A particular implementation of electrically represent data and control states with voltage states and/or signal durations is described in the contemporaneously filed copending application, Serial No. 08/332,337 (pending), entitled Method And Apparatus For Serial Bus Elements Of An Hierarchical Serial Bus To Electrically Represent Data And Control States To Each Other, which is hereby fully incorporated by reference.

Except for bus controller 14, system unit 12 is intended to represent a broad category of system units of computer systems whose constitutions and functions are well known, and will not be otherwise further described. Similarly, except for bus interfaces 22, peripherals 16 are intended to represent a broad category of desktop peripherals, such as keyboards, mouses, monitors, speakers, microphone, telephones, whose constitutions and functions are also well known, and will not be otherwise further described either. Bus controller 14, bus signal distributors 18 and bus interfaces 22 will be described in more detail below with additional references to the remaining figures.

Figure 2:
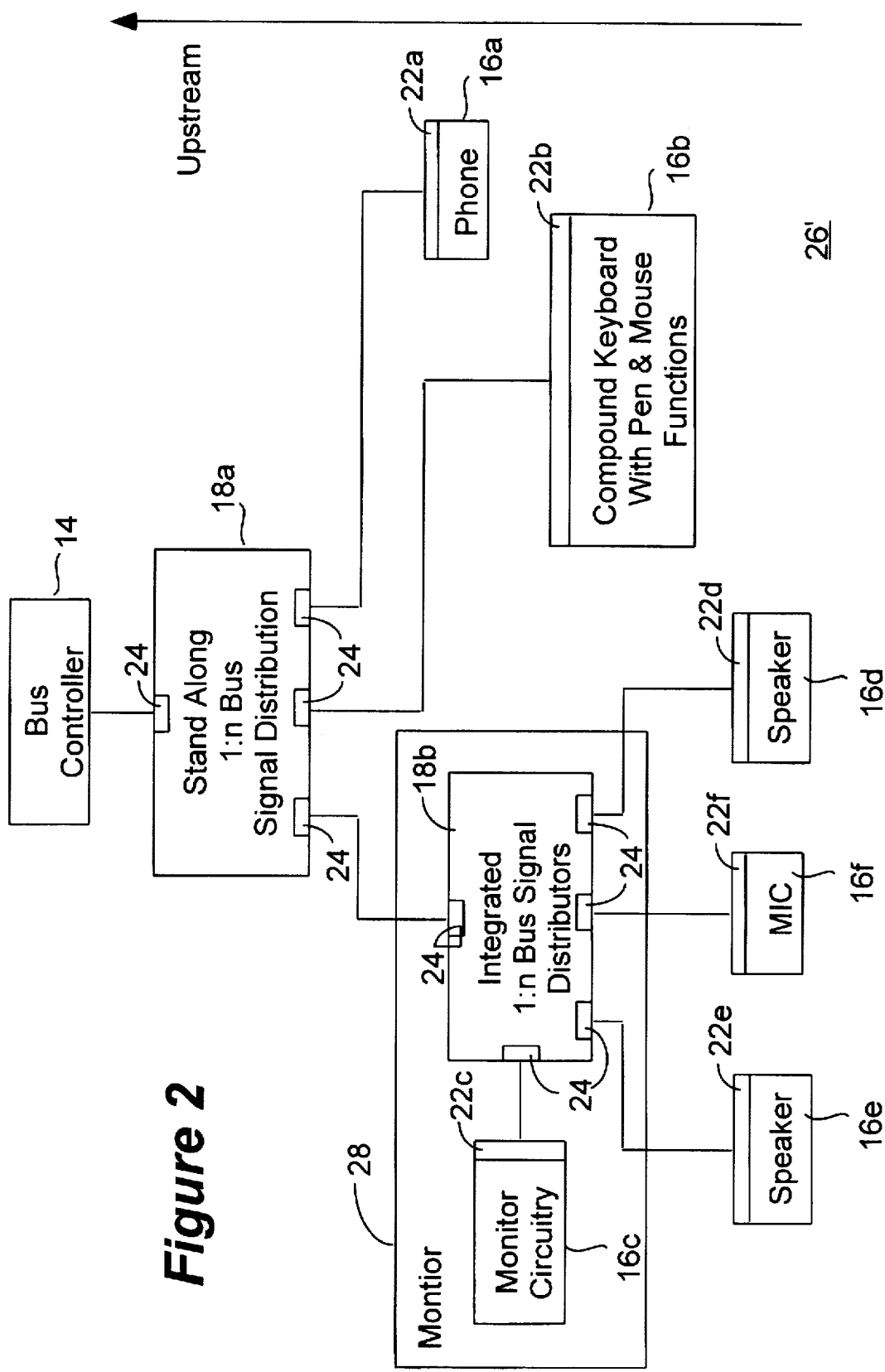
FIG. 2 illustrates one embodiment of the serial bus assembly of FIG. 1 in further detail.

FIG. 2 illustrates one embodiment of the serial bus assembly of FIG. 1 in further detail. For this embodiment, serial bus assembly 26' includes serial bus controller 14, standalone 1:n bus signal distributor 18a, integrated 1:n bus signal distributor 18b, and bus interfaces 22a–22f. The serial bus assembly 26' interconnects bus agents telephone 16a, compound keyboard 16b including keyboard, pen and mouse functions, monitor circuitry 16c of monitor 28, speakers 16d–16e and microphone 16f to system unit 12. Together, the system unit 12, the serial bus elements 14, 18a–18b and 22a–22f, and the interconnected peripherals 16a–16f form an hierarchy of interconnected devices.

Under the present invention, a bus interface 22a–22f is always a termination point. Only a bus signal distributor, e.g. 18a, may have one or more bus signal distributors, e.g. 18b, and/or one or more bus interfaces, e.g. 16a, coupled upstream to it. For the purpose of this disclosure, upstream means "towards the bus controller". Thus, except for the degenerate case where the serial bus assembly 26 has only one connecting peripheral 16, typically it is a bus signal distributor, such as 18a, that is connected upstream to the bus controller 14.

Furthermore, under the present invention, a connecting peripheral may be an isochronous peripheral, such as telephone 16a, speakers 16d–16e, and microphone 16f, or asynchronous peripherals, such as compound keyboard 16b and monitor 16c. The isochronous peripherals may operate with a data transfer rate as high as 5 Mbps, while the asynchronous peripherals may operate with a data transfer rate as high as 100 kbps. Furthermore, a connecting peripheral 16a 16f may be a multiple function peripheral, i.e. multiple functions mapping to a single bus connection point serviced by a bus interface, e.g. 22b. Similarly, although not shown, the system unit 12 may support multiple clients.

Figure 3:
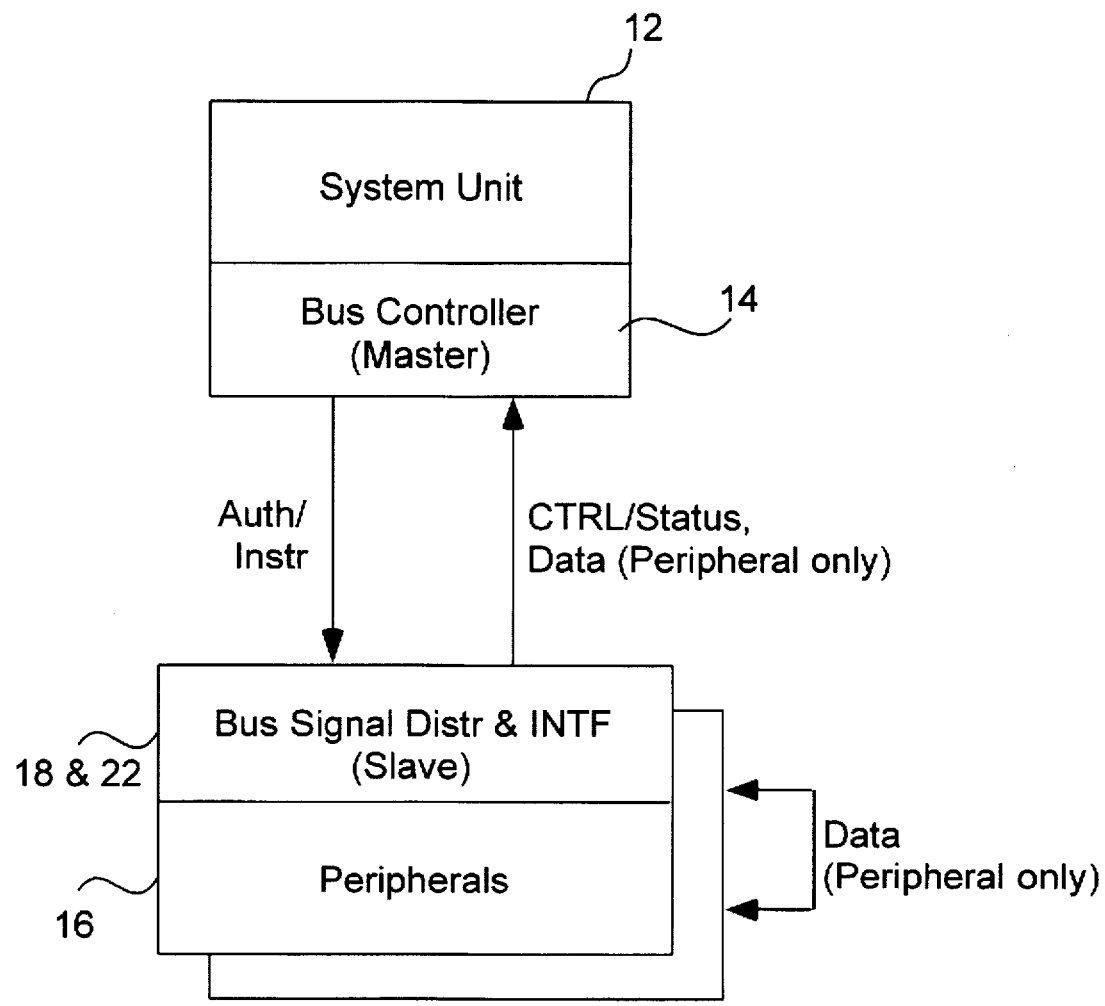
FIG. 3 illustrates a master/slave model of flow control employed by the present invention for serially interfacing the interconnected peripherals to the system unit and controlling transaction flows.

FIG. 3 illustrates a master/slave model of flow control employed by the present invention for serially interfacing the interconnected peripherals to the system unit and controlling transaction flow. As illustrated, the bus controller 14, the signal bus distributors 18, and the bus interfaces 22 cooperate to implement the master/slave model of flow control. The bus controller 14 serves as the master, and the signal bus distributors 18 as well as the bus interfaces 22 behave as slave devices to the bus controller 14.

Under the master/slave model, the bus controller 14 provides flow control for all data communication transactions between the bus agents at their respective operating speeds. The bus interfaces 22 engage in data communication transactions on behalf of the functions of the peripherals 16. However, the bus interfaces 22 accept or transmit data only if they have been authorized or instructed (aka "polled") to do so by the bus controller 14. The bus signal distributors 18 serve strictly as signal distributors. They are merely transparent conduits when data communication transactions are conducted by the bus controller 14 and the bus interfaces 22 on behalf of the bus agents. Thus, the bus signal distributors 18 never actively participate in data communication transactions, accept data or respond with data.

The bus controller 14 systematically polls the functions of the interconnected peripherals 16 through their bus interfaces 22 for data communication transactions in accordance to a polling schedule which guarantees latencies and bandwidths to the isochronous functions of the interconnected peripherals 16. Polling of the isochronous functions of the interconnected peripherals 16 for data communication transactions are prioritized over for all other polling and as frequent as they are necessary to meet the guaranty. Polling of the asynchronous functions of the interconnected peripherals 16 through their bus interfaces 22 for data communication transactions are scheduled around the polling of the isochronous functions of the interconnected peripherals 16 for data communication transactions. Preferably, the polling schedule is dynamically adapted to the interconnected peripherals 16 actually present.

In some embodiments, the bus controller 14, the bus signal distributors 18 and the bus interfaces 22 further engage in connection management transactions employing the same master/slave model for flow control. Similarly, the bus controller 14 provides flow control for conducting the connection management transactions at the serial bus elements' respective operating speeds. The bus signal distributors 18 and the bus interfaces 22 respond to the connection management transactions, replying with control/status information as appropriate. The bus controller 14, during operation, polls the bus signal distributors 18 and the bus interfaces 22 for such transactions. Polling of the bus signal distributors 18 and the bus interfaces 22 for connection management transactions are also scheduled around polling of the isochronous functions of the interconnected peripherals 16 for data communication transactions. Preferably, the expanded polling schedule is also dynamically adapted to the serial bus elements actually present.

Figure 4:
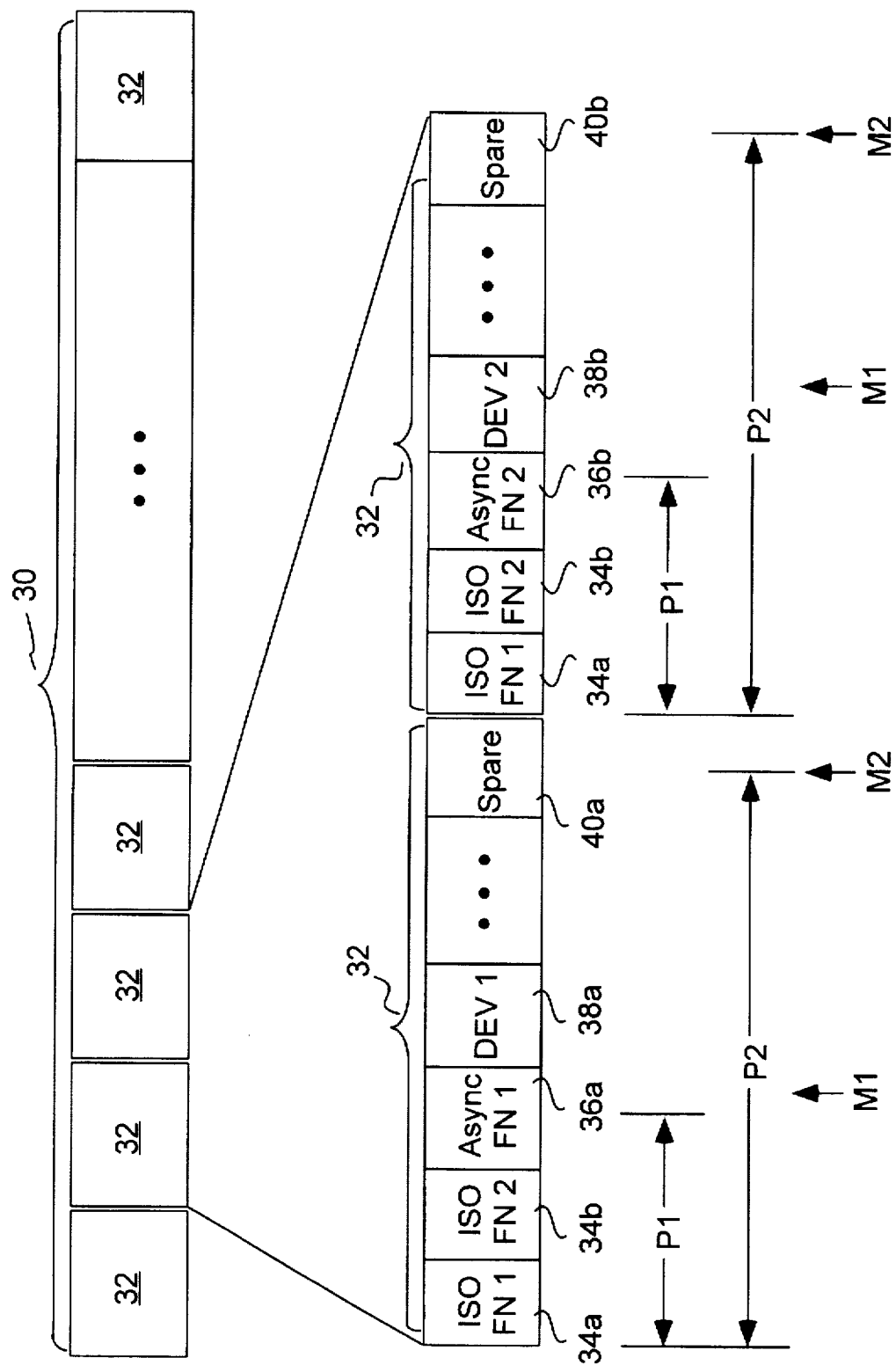
FIG. 4 illustrates a frame based polling schedule of the present invention implemented by some embodiments for polling the slave "devices"

FIG. 4 illustrate a frame based polling scheduling of the present invention implemented by some embodiments for conducting the various transactions employing the master/slave model of flow control. As illustrated, the polling schedule 30, also referred to as a super frame, comprises of a number of sub-schedules 32, also referred to as soft frames. An isochronous function 34a or 34b of an interconnected peripheral 16 is polled as frequent as it is necessary in one or more soft frames 32 of the super frame 30 to guarantee its latency and bandwidth. However, an asynchronous function 36a or 36b is polled only once in one soft frame 32 of the super frame 30 for data communication transaction. Similarly, an interconnected device 38a or 38b is also polled only once in one soft frame 32 of the super frame 30 for connection management transaction.

Preferably, all isochronous functions 34a–34b are polled within a first percentage portion (P1) of a soft frame 32 to ensure the latency and bandwidth guaranties are met. Isochronous functions that cannot be accommodated within P1 are preferably rejected for insufficient capacity. The upper delimiter (M1) of P1 is also referred to as the isochronous watermark. Similarly, all polling are preferably performed within a second percentage portion (P2) of a soft frame 32 to ensure reliability of operation. Multiple soft frames 32 are employed if necessary to accommodate all asynchronous function and serial bus element polling. The upper delimiter (M2) of P2 is also referred to as the frame watermark.

Various manners in which such a frame based polling schedule may be dynamically generated and updated, are described in more detail below.

Figure 5:
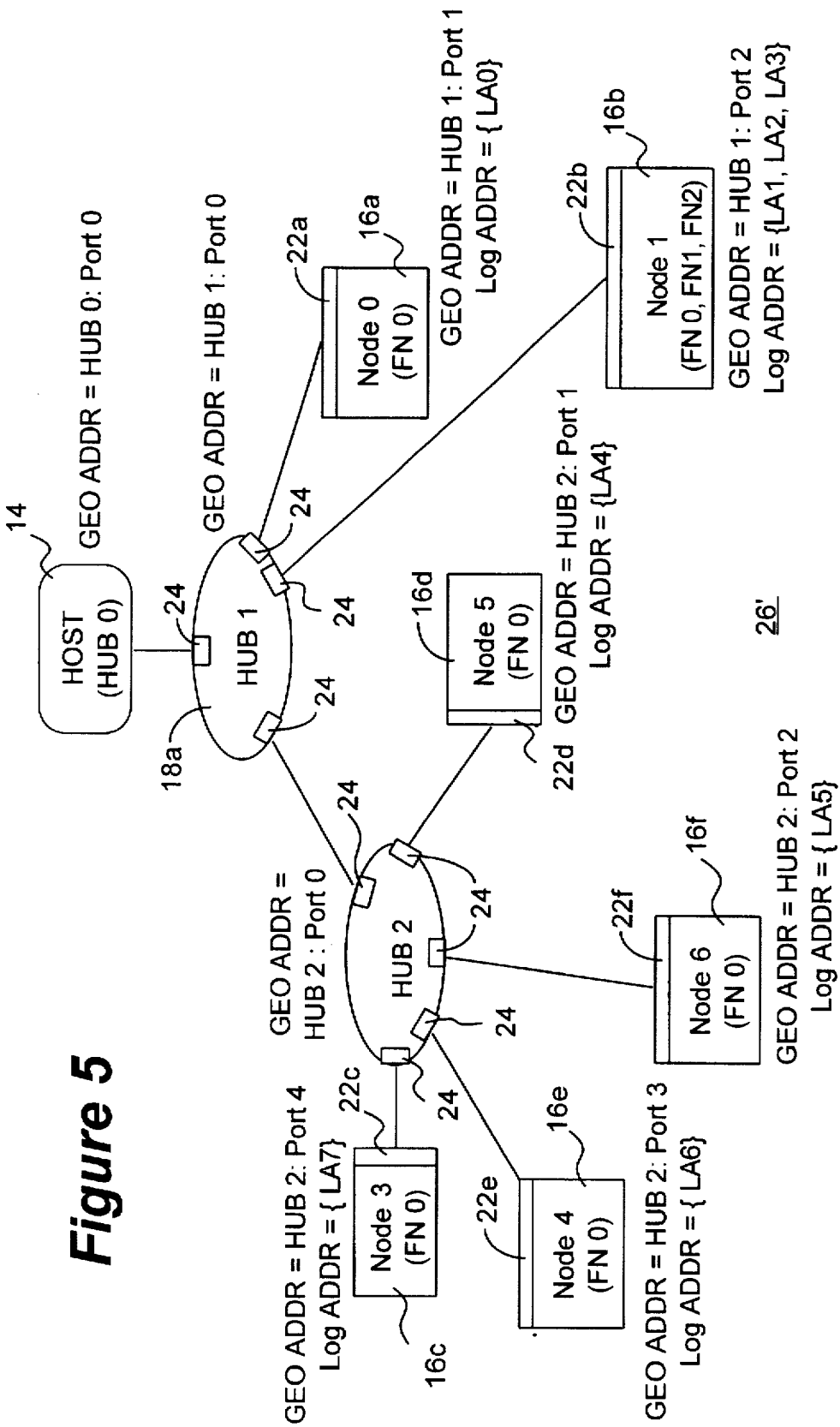
FIG. 5 illustrates geographical and logical addressing of the present invention implemented by some embodiments for addressing serial bus elements and functions of bus agents.

FIG. 5 illustrates geographical and logical addressing of the present invention implemented by some embodiments for addressing the serial bus elements and functions of bus agents. For ease of explanation, the same exemplary serial bus assembly of FIG. 2 is used. However, the bus controller 14 is labeled as Host, also referred to as Hub0. The bus signal distributors 18a–18b are labeled as Hub1 and Hub2. The peripherals 16a–16f including their corresponding bus interfaces 22a–22f are jointly labeled as Node0 through Node6. The functions of peripherals 16a–16f are labeled as FN0, FN1, etc.

As illustrated, the serial bus elements and functions of the bus agents are assigned geographical as well as logical addresses (GEO ADDR & LOG ADDR) of a geographical and a logical address space. More specifically, the Hubs 14, 18a–18b and the Nodes 22a–22f are assigned GEO ADDRes, whereas the functions of the Nodes 16a–16f are assigned LOG ADDRes. Preferably, the Hub identity as well as the upstream port of the Hub may be inferred from the GEO ADDR of a Hub 14, and 18a–18b, and the connecting Hub as well as the connecting port of the connecting Hub may be inferred from the GEO ADDR of a Node 22a–22f. In one embodiment, the LOG ADDRes are assigned to the functions of the Nodes 16a–16f in a chronological manner.

For examples, in the illustrated exemplary application, Hub1 and Hub2 18a and 18b are assigned the GEO ADDRes of "Hub1:Port0" and "Hub2:Port0" respectively, identifying the Hubs 18a and 18b as "Hub1" and "Hub2" respectively, and in each case, the upstream port being "Port0". Node1 and Node4 22b and 22e are assigned the GEO ADDRes of "Hub1:Port2" and "Hub2:Port3" respectively, identifying the connecting Hubs 18a and 18b as "Hub1" and "Hub2" respectively, and the connecting ports of connecting Hubs 18a and 18b as "Port2" and "Port3" respectively. The functions of Node1 16b are assigned the LOG ADDRes of "LA1", "LA2" and "LA3", whereas the function of Node4 16e is assigned the LOG ADDR of "LA6".

Preferably, the GEO ADDRes and the LOG ADDRes are dynamically assigned at power on or reset, and updated in response to live detachment of interconnected devices or attachment of additional devices, by the bus controller 14 in cooperation with the bus signal distributors 18 and the bus interfaces 22. A particular implementation of such dynamic connection management is described in the copending application, Ser. No. 08/332,375 (pending), entitled Method And Apparatus For Dynamically Determining And Managing Connection Topology Of An Hierarchical Serial Bus Assembly, which is hereby fully incorporated by reference.

For these embodiments, the GEO ADDRes are used to conduct connection management transactions among the serial bus element, whereas the LOG ADDRes are used to conduct data communication transactions among the functions of the bus agents The separation of the two types of transactions into the two separate address spaces facilitate dynamic connection management of the serial bus elements, without having to interrupt services to the functions of the bus agents.

Figure 6:
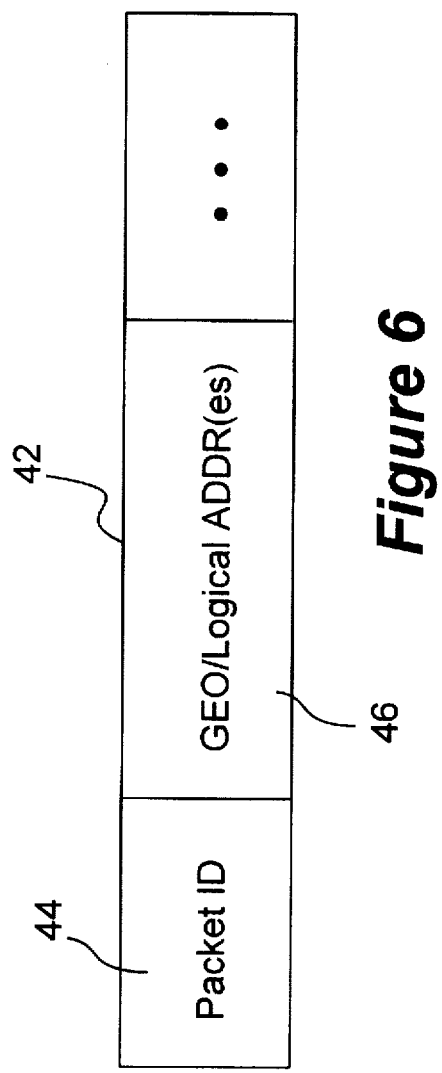
FIG. 6 illustrates the essential elements of communication packets of the present invention implemented by some embodiments for conducting transactions employing the master/slave model of flow control.

FIG. 6 illustrates the essential elements of communication packets of the present invention implemented by some embodiments for conducting the various transactions employing the master/slave model of flow control. For these embodiments, packet identifiers 44 are employed to differentiate control packets from data packets. Control packets are packets employed by the bus controller 14 to authorize or instruct the bus signal distributors 18 and the bus interfaces 22 to engage in transactions. Control packets may also include packets employed by the bus signal distributors 18 and the bus interfaces 22 to acknowledge authorizations or instructions from the bus controller 14. Furthermore, addresses 46 are employed as appropriate to identify the transaction parties. As will be appreciated that under the master/slave model of flow control, the bus controller 14 as a transaction participant may often be inferred, and therefore its address may be omitted.

Preferably, transaction flow, such as from bus controller 14 to a function, from a first function to a second function, may be inferred from the packet identifiers 44. Preferably, either geographical or logical addresses 46, i.e. "HubX: PortY" or "LAz", may be specified to accommodate those embodiments that support connection management transactions and implement both types of addresses.

A particular implementation of employing such communication packets to conduct the various transactions is described in the contemporaneously filed copending application, Ser. No. 08/332,573 (now abandoned), entitled Method And Apparatus For Exchanging Data, Status And Commands Over An Hierarchical Serial Bus Assembly Using Communication Packets, which is hereby fully incorporated by reference.

Figure 8:
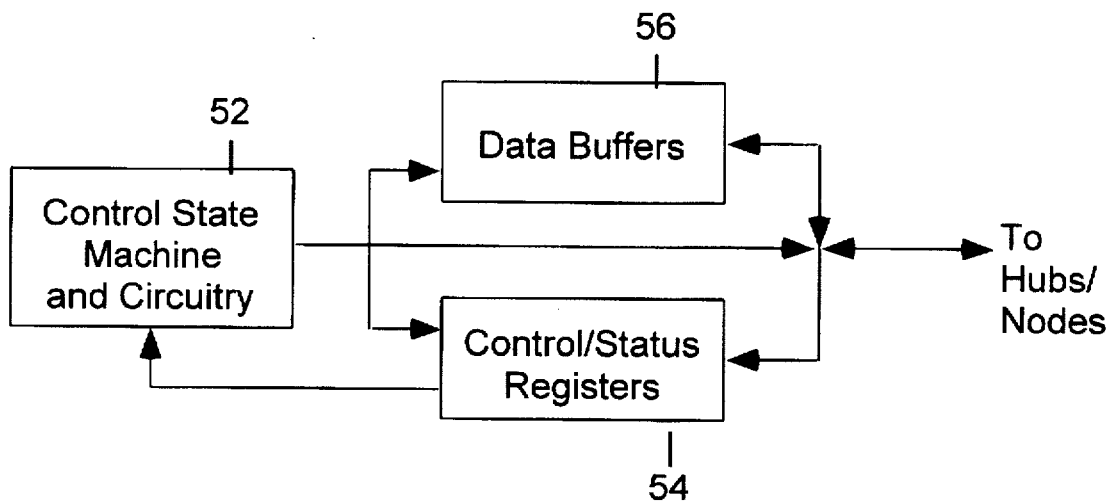
FIGS 8–9 illustrate one embodiment of the bus controller of the present invention including its associated software.
Figure 9:
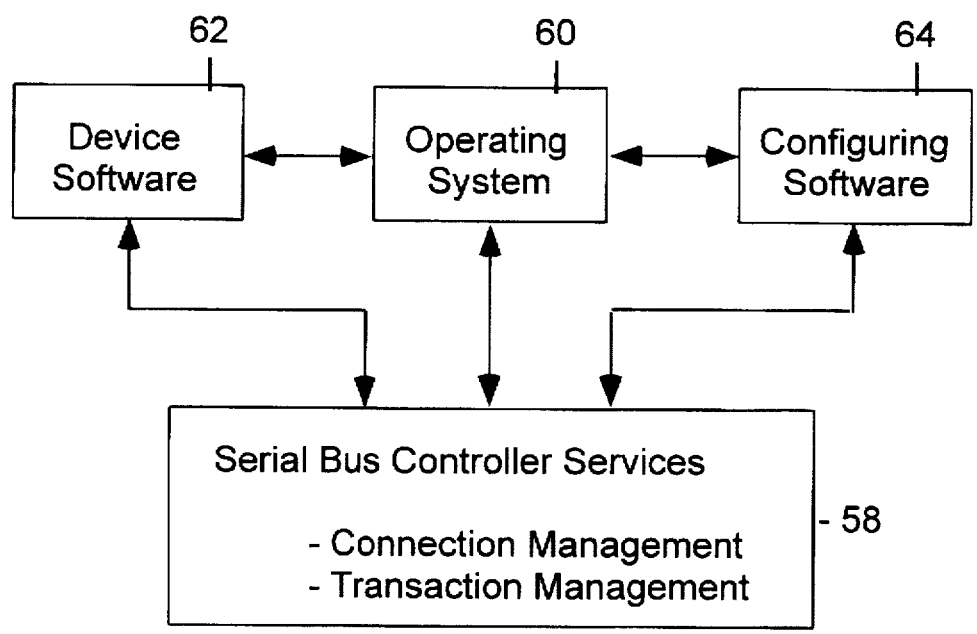

FIGS. 8–9 illustrate one embodiment of the bus controller of the present invention. In this embodiment, the bus controller 14 includes a control state machine and circuitry 52, control/status registers 54, data buffers 56, and bus controller software services 58. The control/status registers 54 are used to store the various control and status data. For examples, the serial bus elements present, their interconnection topology, the functions of the various interconnected peripherals, the geographical addresses assigned to the serial bus elements, the logical addresses assigned to the functions of the interconnected peripherals. The data buffers 56 are used to buffer the data of the data communication transactions between the bus agents. The control state machine and circuitry 52 operates the hardware, controlling data communication transactions and employing the above described master/slave model of flow control, under the programming of the bus controller software services 58. For some embodiments, the control state machine and circuitry 52 further operates the hardware, controlling connection management transactions, implementing the master/slave model of flow control with frame based polling schedule, employing geographical and logical addressing, supporting communication packet based transactions, and/or inference of data and control states from states of the propagation electrical signals. In particular, the control and state machine circuitry 52 causes the bus controller 14 to cooperate with the bus signal distributors 18 and the bus interfaces 22, and perform the frame based polling schedule generation and maintenance steps of the present invention, which will be described in more below.

The bus controller software services 58 program the control state machine and circuitry 52 responsive to the operating system 60 and other software such as device and configuring software 62 and 64 of the system unit 12. In particular, the services include connection management such as detection of serial bus elements present, detection of their interconnection topology, detection of the functions of the interconnected peripherals, and assignment of the geographical and logical addresses. The services further include transaction management such as generation and maintenance of the polling schedule, polling of the serial bus elements and functions of the bus agents, acknowledgment of certain responses of the serial bus elements and functions of the bus agents, and exchange of data with functions of the bus agents.

For a more detailed description of the bus controller hardware and the bus controller software services 58, refer to the incorporated by reference copending applications, Ser. No. 08/332,375, 08/332,573 and 08/332,337. It should be noted that the allocation of functions to the hardware and software services of the bus controller 14 is implementation dependent. The present invention may be practiced with any number of allocations, ranging from minimal hardware usage to minimal employment of software services.

Figure 10:
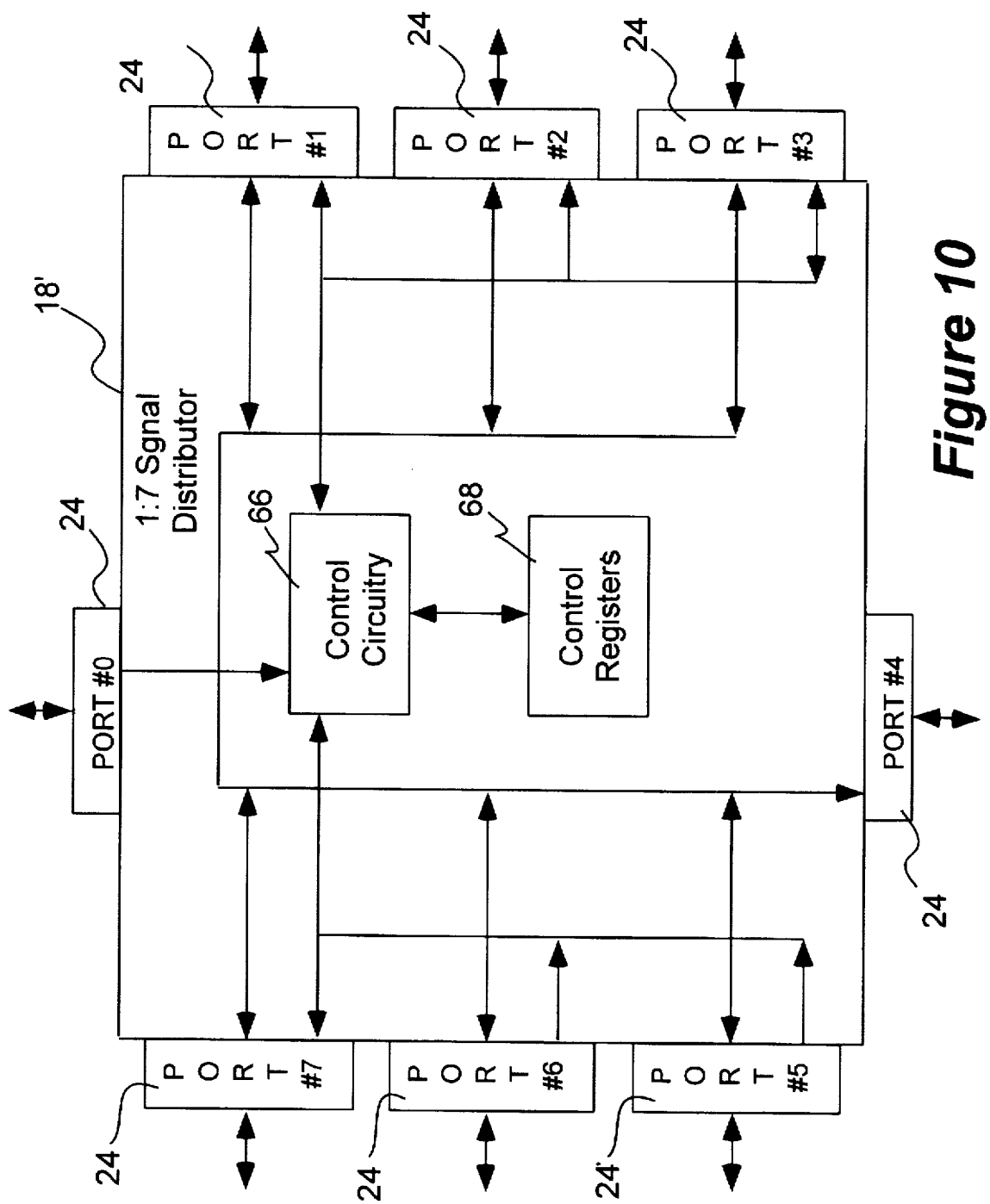
FIGS. 10–11 illustrate one embodiment of the 1:n bus signal distributor of the present invention including its port circuitry.
Figure 11:
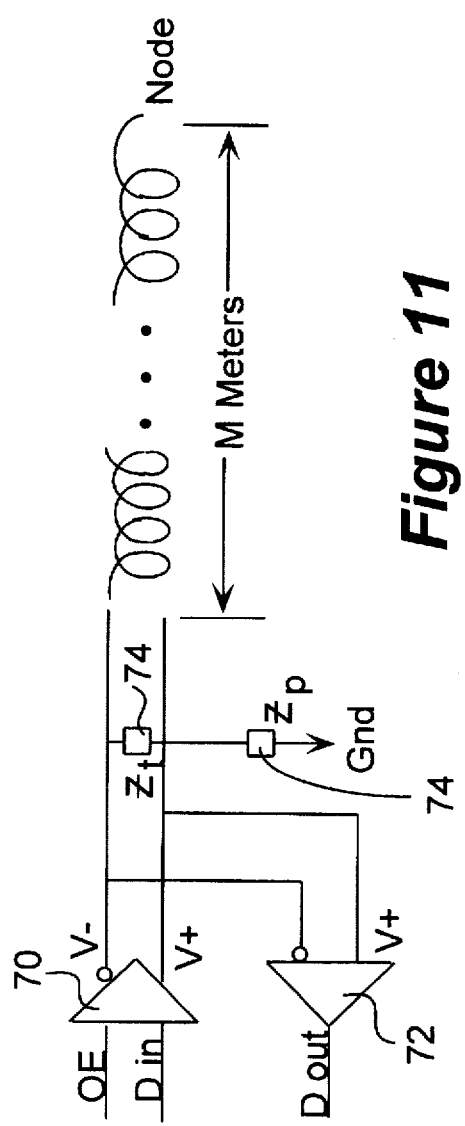

FIGS. 10–11 illustrate one embodiment of the bus signal distributor of the present invention. The illustrated embodiment is a 1:7 bus signal distributor 18' having control circuitry 66, control registers 68, and 8 ports 24. Port 0 24 is used to connect the bus signal distributor 18' upstream to the bus controller 14 or another bus signal distributor 18. Ports 1–7 are used to connect up to a total of 7 bus signal distributors 18 and/or bus interfaces 22 to itself. The control registers 68 are used to store its own control and status information such as whether a port 24 has a bus interface 22 connected to it or not, and whether the port 24 is turned ON/OFF. The control circuitry 66 operates the bus signal distributor 18' responsive to instructions from the bus controller 14. In particular, the control circuitry 66 causes the bus signal distributor 18 to cooperate with the bus controller 14, and perform the frame based polling schedule generation and maintenance steps of the present invention, which will be described in more detail below.

In embodiments where the low cost two signal wire cables 20 are used to interconnect the serial bus elements, and electrical signals are preferably propagated in a differential manner, each port 24 comprises two differential amplifiers 70 and 72 for generating the differential signals. Preferably, each port 24 further having two resistors 74 coupled to ground as shown, pulling the signals on the two wires to ground, thereby allowing the absence or presence of a connected bus interface 22 to be discernible. The appropriate values of resistors 74 may be determined empirically depending on individual implementations.

For a more detailed description of the bus signal distributor 18, refer to the incorporated by reference copending application, Ser. No. 08/332,375 (pending).

Figure 13:
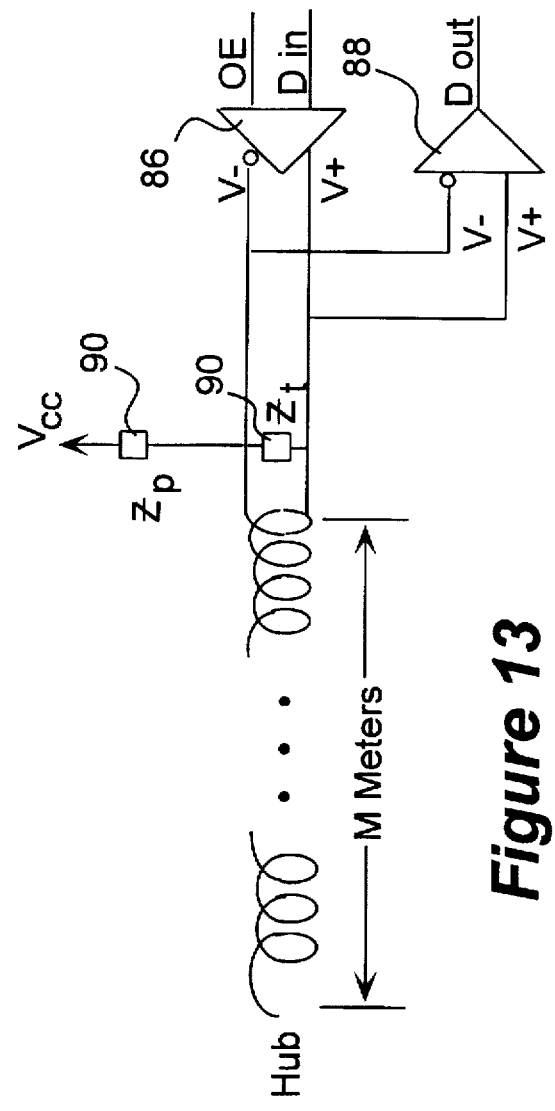
FIGS. 12–13 illustrate one embodiment of the bus interface of the present invention including its connector circuitry.
Figure 12:
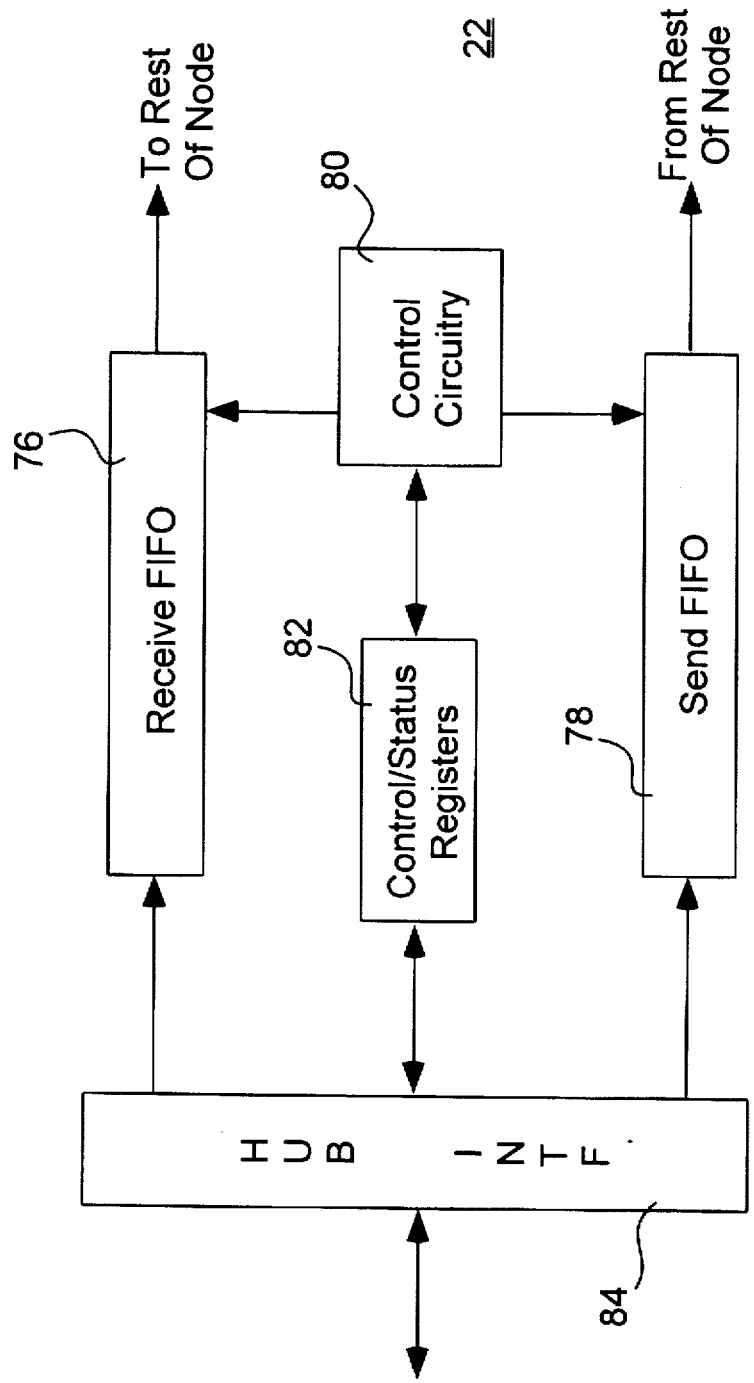

FIGS. 12–13 illustrate one embodiment of the bus interfaces of the present invention. For this embodiment, the bus interface 22 comprises control circuitry 80, control/status registers 82, a Connector interface 84 and two FIFOs 76–78, a Receive FIFO 76 and a Send FIFO 78. Receive and Send FIFOs 76–78 are used to stage the receive and send data for data communication transactions. The control/status registers 68 are used to store its own control and status information such as its assigned geographical address, functions of its "host" peripheral, and their assigned logical addresses. The control circuitry 66 operates the bus interface 22 on behalf of the "host" peripheral and the "host" peripheral's functions, responsive to authorizations and instructions from the bus controller 14. In particular, control circuitry 66 causes the bus interface 22 to cooperate with the bus controller 14, and perform the frame based polling schedule generation and maintenance steps of the present invention, which will be described in more detail below.

In embodiments where the low cost two signal wire cables 20 are used to interconnect the serial bus elements, and electrical signals are preferably propagated in a differential manner, the Connector interface 84 comprises two differential amplifiers 86 and 88 for generating the differential signals. Preferably, the Connector interface 84 further includes two resistors 90 coupled to Vcc as shown, pulling the signals on the two wires to Vcc complementary to the port circuitry of a connecting bus signal distributor 18. The appropriate values of resistors 90 may also be determined empirically depending on individual implementations.

For a more detailed description of the bus interface 22, refer to the incorporated by reference copending applications, Ser. No. 08/332,375, 08/332,573 and 08/332,337.

Frame Based Polling Schedule Generation and Maintenance

Having now described the hierarchical serial bus assembly 26 and the manner its elements cooperate to serially interface the isochronous and asynchronous peripherals 16 to the system unit 12 of the exemplary computer system 10, the frame based polling schedule generation and maintenance steps of the present invention performed by the serial bus elements will now be described in detail.

Figure 14:
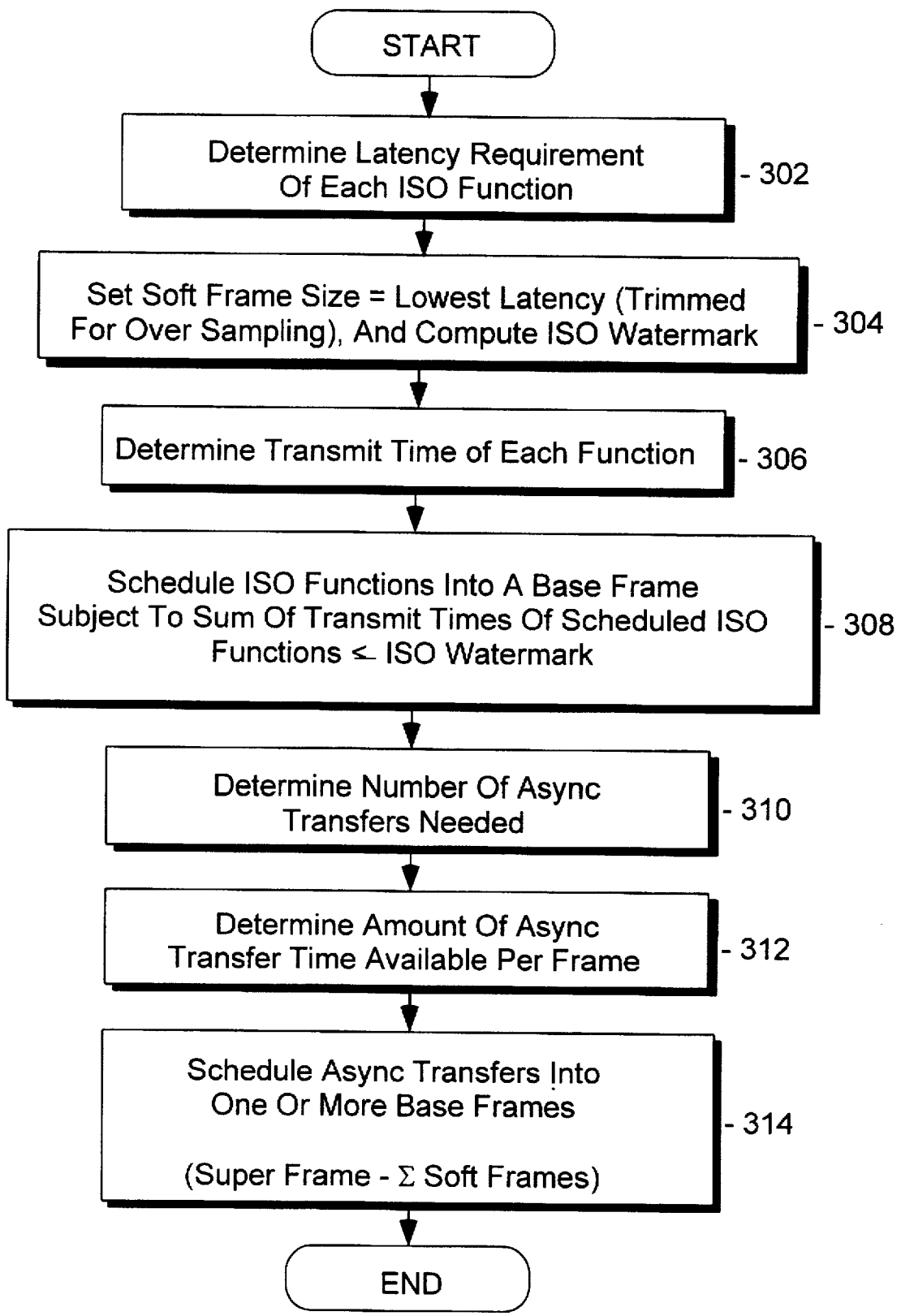
FIG. 14 illustrates the lowest latency method of the present invention for generating a frame based polling schedule that guaranties latencies and bandwidths of isochronous functions.

FIG. 14 illustrates the lowest latency method of the present invention for generating a frame based polling schedule that guaranties latencies and bandwidths of isochronous functions. As illustrated, at power on or reset, the bus controller 14, in cooperation with the other serial bus elements, determines the latency requirement of each isochronous function, step 302, sets the soft frame size to the lowest latency requirement, step 304, computes the isochronous watermark for the soft frame, step 304, and determines the transmit times of the isochronous data and all asynchronous transfers, step 306. Latency requirements of an isochronous function is dependent on the queue depth and dequeuing rate of the isochronous peripheral. Typically, a margin of reliability is also employed.

Preferably, the latency requirements of the isochronous functions and the transmit times of isochronous data and asynchronous transfers are gathered from the interconnected peripherals as an integral part of the power on/reset initialization process. Alternatively, the latency requirements and the transmit times may be gathered post initialization with connection management transactions.

Upon having set the soft frame size, computed the isochronous watermark, and determined the transmit times of the isochronous data and the asynchronous transfers, the bus controller 14 schedules as many polling of isochronous functions as possible into a soft frame, subject to the constraint of the cumulated transmit times of the scheduled isochronous functions being less than the isochronous watermark, step 308. Residual isochronous functions, if any, are rejected by the bus controller 14 for exceeding the bus capacity. Thus, each scheduled isochronous function is guaranteed to be polled with a frequency sufficient to meet its latency requirement, and at each polling it is guaranteed to be polled with a bandwidth sufficient for its transmit time.

The soft frame used to schedule the isochronous functions is also referred to as the base soft frame. The manner in which the isochronous function scheduling step is performed will be described in more detail below with additional references to FIGS. 15a–15c.

After having scheduled polling of the isochronous functions, the bus controller 14 determines the number of asynchronous transfers needed, i.e. the number of asynchronous functions to be polled, the number of connection management transactions to be polled to detect live attachment/detachment of serial bus elements, etc., step 310. The bus controller 14 further determines the amount of asynchronous transfer time available per soft frame, by subtracting the cumulative transmit time of the scheduled isochronous functions from the frame watermark portion of a soft frame, step 312. Finally, the bus controller 14 schedules the asynchronous transfers in one or more soft frames, around the polling of the isochronous functions, step 314. The residual portion beyond the frame watermark is reserved to ensure reliability of operation. The manner in which the asynchronous transfer scheduling step is performed will also be described in more detail below with additional references to FIG. 16.

In some embodiments, the above described process is repeated upon detection of live attachment/detachment of serial bus elements, thereby dynamically adapting in real time the frame based polling schedule to the serial bus elements actually present. The manner in which step 308 is performed is slightly different when the process is repeated in response to detection of live attachment/detachment of serial bus elements. These differences will be noted when step 308 is described in more detail below.

Figure 15A:
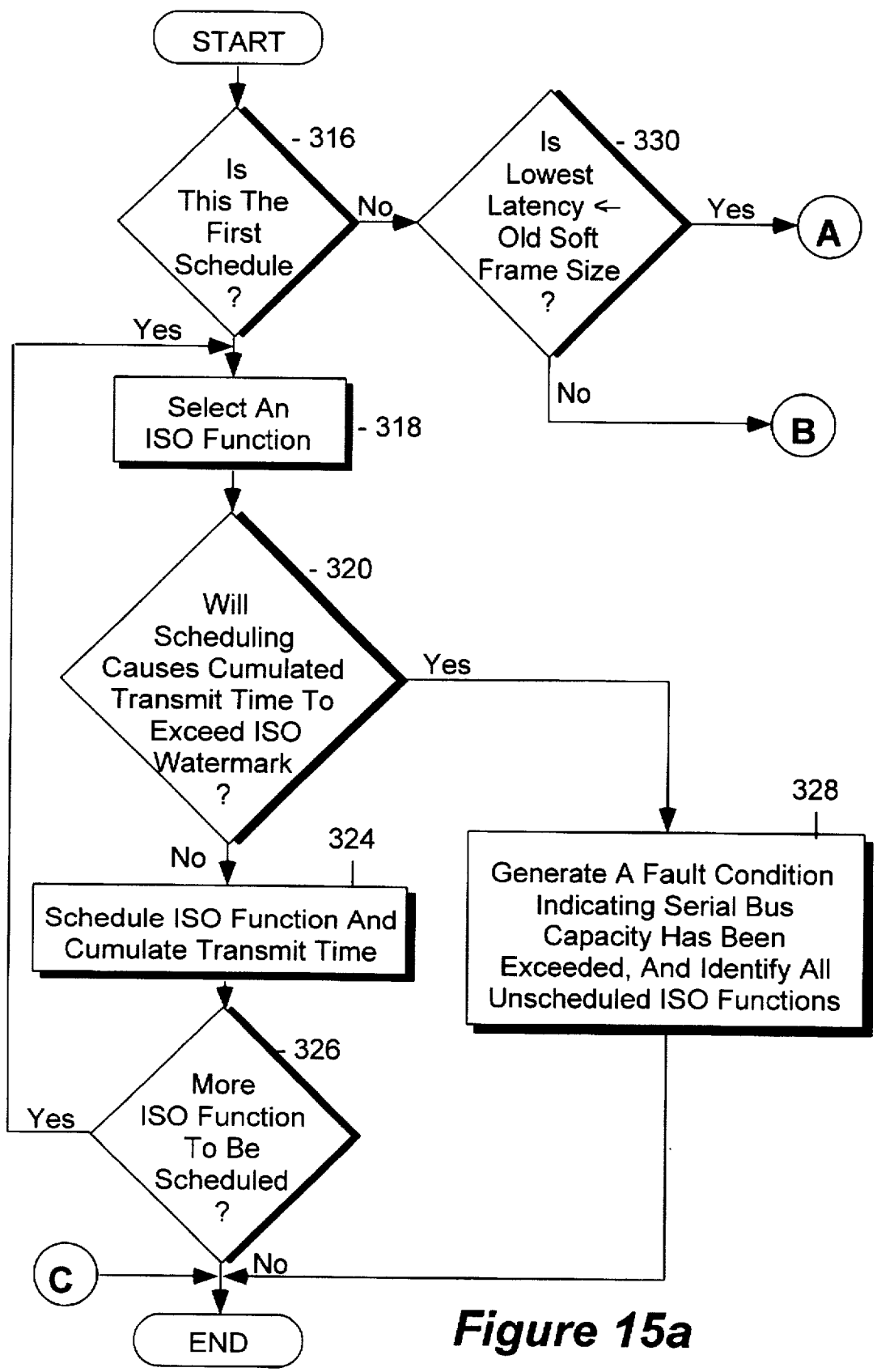
FIGS. 15a–15c illustrate the method steps of the present invention for scheduling polling of isochronous functions in a soft frame under the lowest latency method.
Figure 15B:
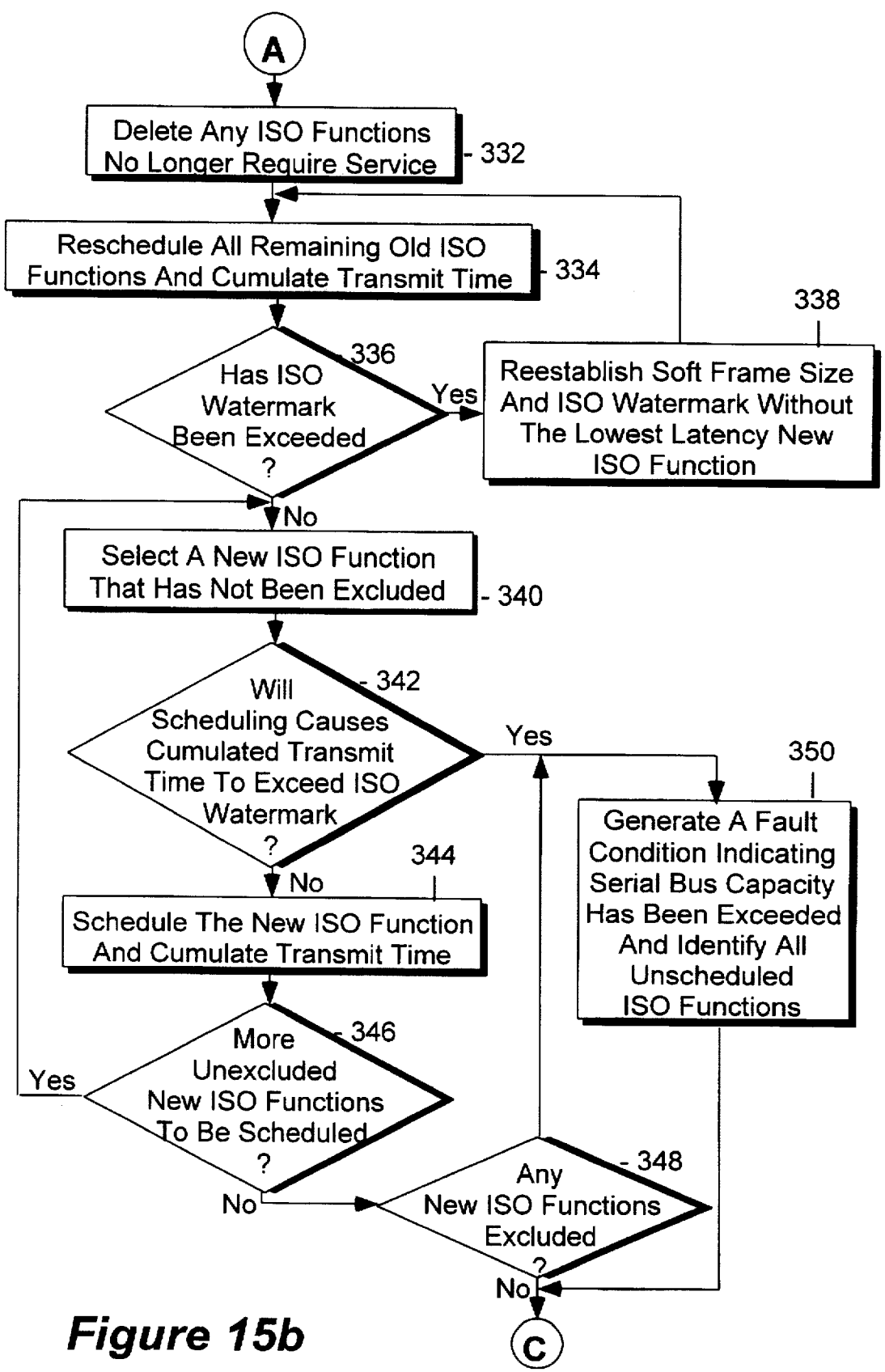
Figure 15C:
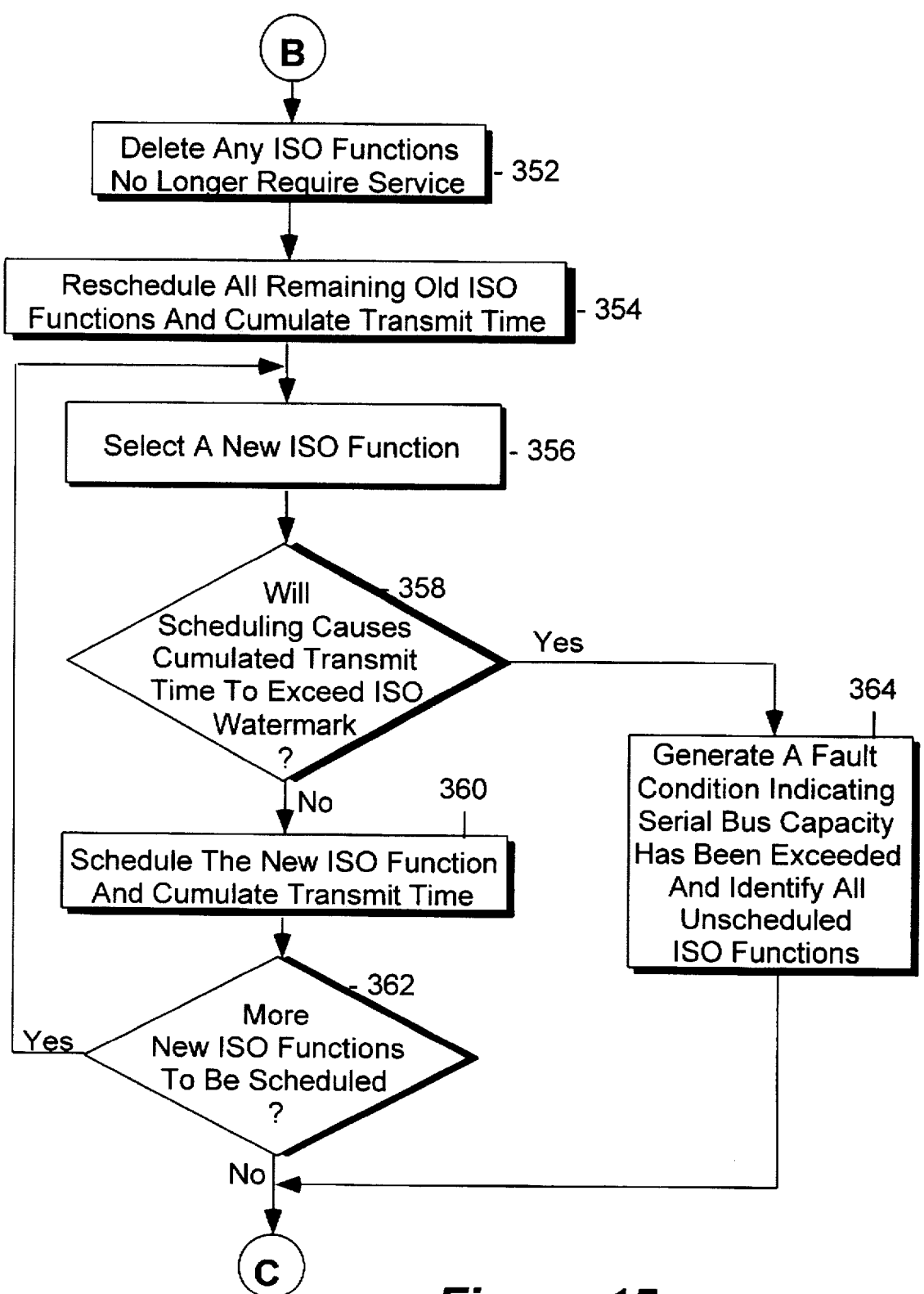

FIGS. 15a–15c illustrate the method steps of the present invention for scheduling polling of isochronous functions in a soft frame under the lowest latency method. Initially, the bus controller 14 determines whether it is generating the first polling schedule, step 316, i.e. whether it is scheduling at power on/reset or in response to live attachment/detachment of serial bus elements. If the scheduling is being performed for the first schedule, the bus controller 14 immediately proceeds to select one of the isochronous functions for scheduling, step 318. Selection may be made arbitrarily or based on some priority schemes. Next, the bus controller 14 determines if scheduling the selected isochronous function will cause the cumulative transmit time of the scheduled isochronous functions to exceed the isochronous watermark, step 320. If scheduling would not cause the cumulative transmit time to exceed the isochronous watermark, the bus controller 14 schedules the isochronous function, and adds the transmit time of its isochronous data into the cumulative transmit time of the scheduled isochronous functions, step 324.

Upon scheduling the isochronous function, the bus controller 14 checks to determine if there are additional polling of isochronous functions that need to be scheduled, step 326. If additional polling of isochronous functions need to be scheduled, the bus controller 14 returns to step 318, otherwise, scheduling of isochronous functions is completed.

Whenever the bus controller 14 determines at step 320 that scheduling of a selected isochronous function would cause the cumulated transmit time of scheduled isochronous functions to exceed the isochronous watermark, the bus controller 14 rejects the selected isochronous function and terminates scheduling, step 328. Preferably, the bus controller 14 will generate a fault condition indicating that bus capacity has been exceeded, and identifies all unscheduled isochronous functions, step 328.

Back at step 316, if the bus controller 14 determines that the process is not being performed to generate the first polling schedule, i.e. it is being performed to dynamically adapt the polling schedule, the bus controller 14 further determines if the lowest latency is less than or equal to the "old" soft frame size, step 330. If the lowest latency is less than or equal to the "old" soft frame size, the bus controller 14 proceeds to step 332, otherwise it proceeds with step 352.

Continuing now with FIG. 15b, at step 332, the bus controller 14 deletes any isochronous functions no longer require service from the polling schedule. The bus controller 14 then reschedules all the remaining "old" isochronous functions and cumulates their transmit times as described earlier, step 334. Next the bus controller 14 determines if the isochronous watermark has been exceeded or not, step 336. If the isochronous watermark has been exceeded, the bus controller 14 reestablishes the soft frame size and the corresponding isochronous watermark, excluding the isochronous function that yielded the lowest latency, step 338. The bus controller 14 repeats steps 334–338 until it can determine at step 336 that all remaining old isochronous functions have been rescheduled successfully under the isochronous watermark of a soft frame.

The bus controller 14 then proceeds to steps 340–350. Except for step 348, steps 340–350 are identical to the steps 320–328 described earlier. Extra step 348 is performed to cause the fault condition in step 350 to be also generated in the event that the "successful" adaptation of the polling schedule required exclusion of one or more new isochronous functions with low latencies earlier at step 338 to yield the eventual "successful" soft frame size.

Continuing now with FIG. 15c, recall that the bus controller 14 proceeds with step 352 if it decided back at step 330 the lowest latency is greater than the "old" soft frame size. Steps 352 and 354 are the same as steps 332 and 334 described earlier. However, upon rescheduling the old isochronous functions in step 354, steps similar to steps 336 and 338 described earlier are not necessary, since the lowest latency was determined to be greater than the "old" soft frame size back at step 330. Thus, it is not possible for the bus controller 14 to fail to schedule the old isochronous functions under the isochronous watermark of the soft frame. The bus controller 14 than proceeds to schedule the new isochronous functions in steps 356–364. Steps 356–364 are identical to steps 318–328 described earlier.

Figure 16:
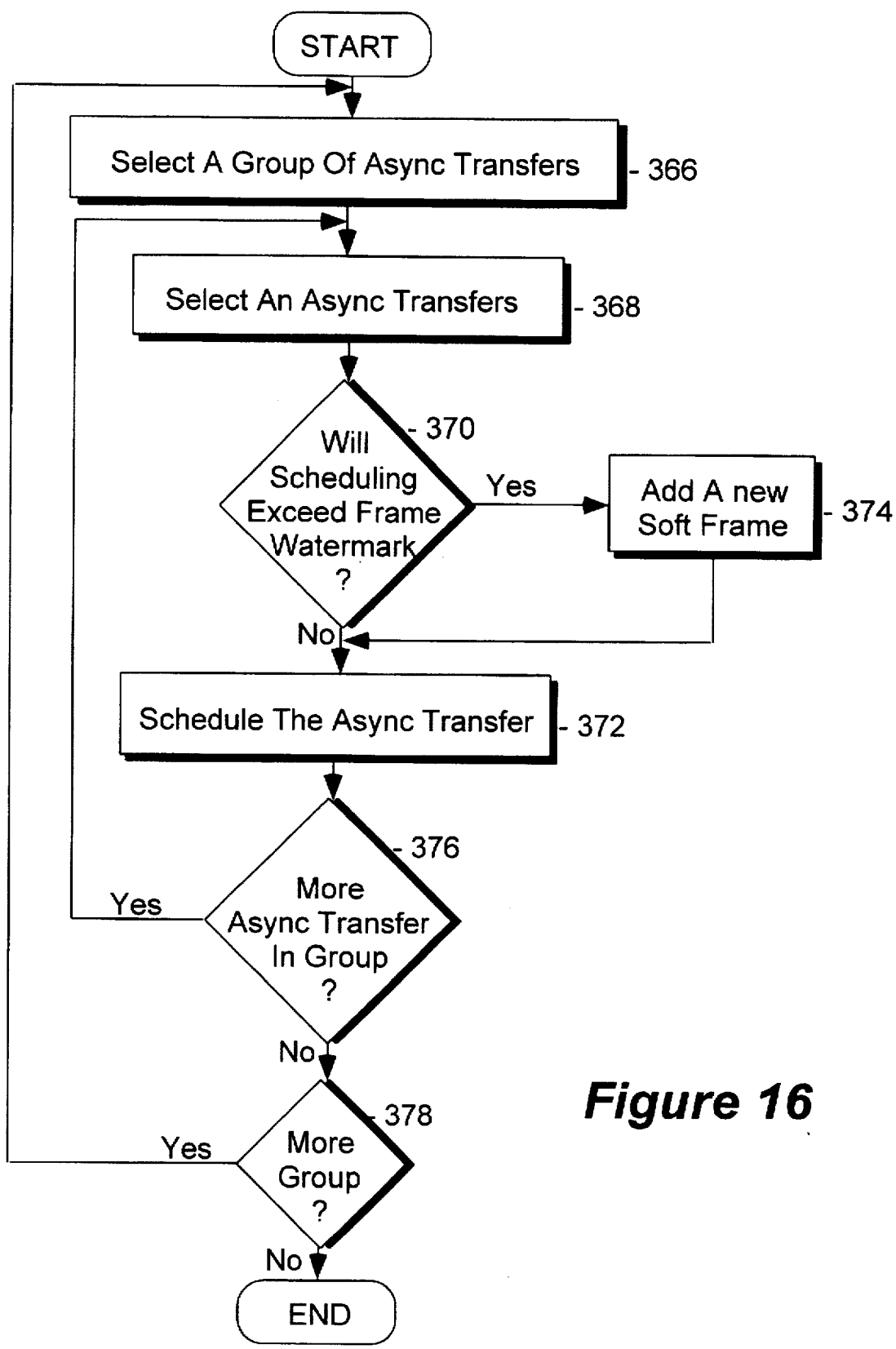
FIG. 16 illustrates one embodiment of the method steps of the present invention for scheduling polling of asynchronous transfers in one or more soft frames under the lowest latency method.

FIG. 16 illustrates one embodiment of the method steps of the present invention for scheduling polling of asynchronous transfers in one or more soft frames under the lowest latency method. In this illustrated embodiment, polling of asynchronous transfers are scheduled by groups. Particular examples of asynchronous transfer groups include attention requests, management queries, and the like. However, it will be appreciated that present invention may be practiced without having the scheduling of asynchronous transfers being performed by groups.

Under the illustrated embodiment, the bus controller 14 first selects a particular asynchronous transfer group for scheduling, step 366. Then, the bus controller 14 selects an asynchronous transfer for scheduling. Again either selection may be made in an arbitrary manner or using some priority schemes. Upon selecting an asynchronous transfer for scheduling, the bus controller 14 determines if scheduling the selected asynchronous transfer would cause the cumulative transmit time of all scheduled functions/transfers to exceed the frame watermark, step 370. If scheduling would not cause the frame watermark to be exceeded, the bus controller 14 schedules the selected asynchronous transfer, step 372. On the other hand, if scheduling would cause the frame watermark to be exceeded, the bus controller 14 adds another base frame, i.e. a new soft frame with similarly scheduled isochronous functions, step 374, before scheduling the selected asynchronous transfer, step 372.

Upon scheduling the selected asynchronous transfer, the bus controller 14 determines if more asynchronous transfers are still to be scheduled within the selected asynchronous transfer group, step 376. If more asynchronous transfers are still to be scheduled, the bus controller 14 repeats steps 368–372, until it is determined at step 376 that all asynchronous transfers within the selected asynchronous transfer group have been scheduled. The bus controller 14 then determines if more asynchronous transfer groups are still to be scheduled, step 378. If more asynchronous transfer groups are still to be scheduled, the bus controller 14 repeats steps 366–376, until it is determined at step 378 that all asynchronous transfer groups have been scheduled.

Figure 17B:
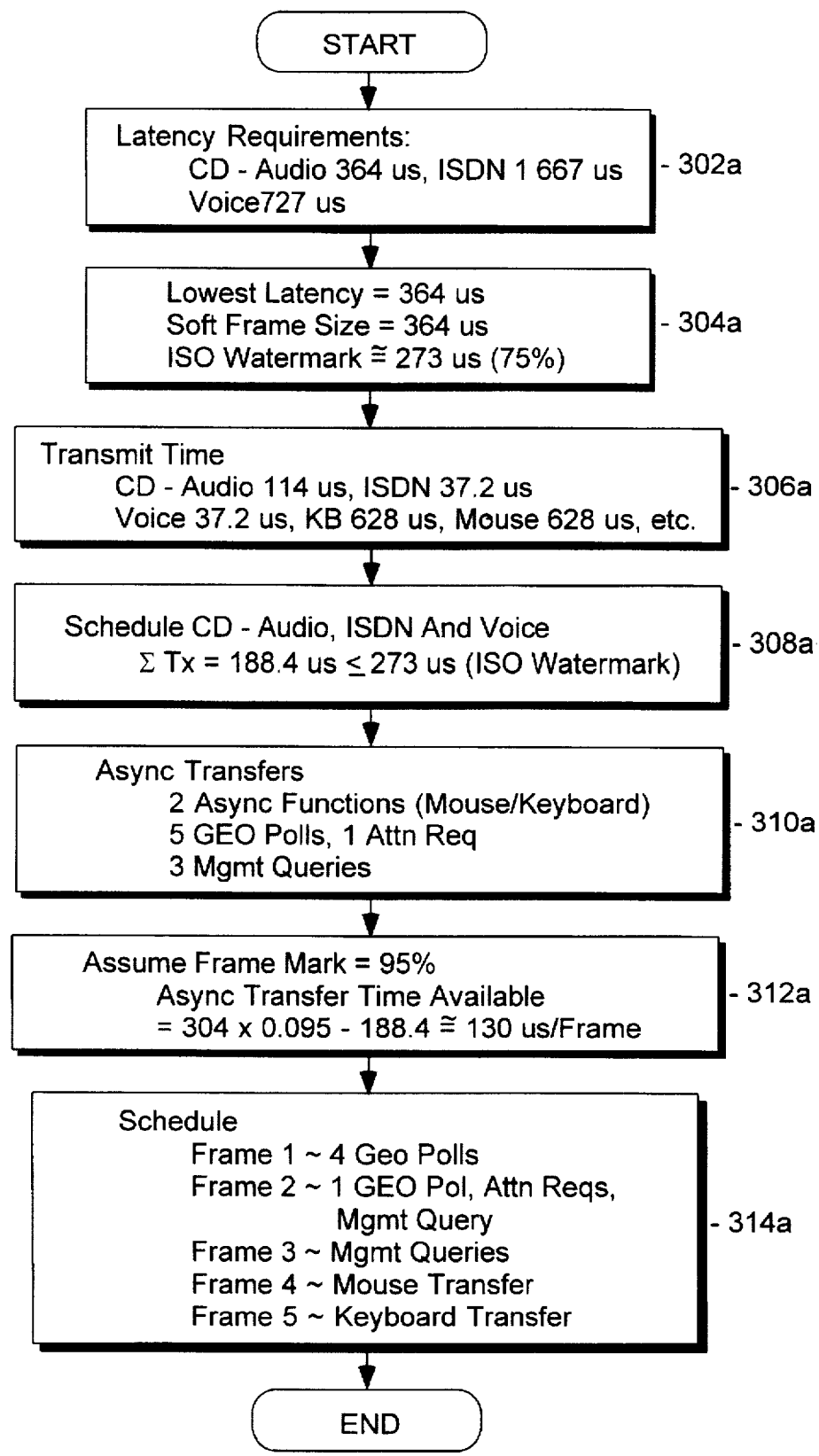
Figure 17C:
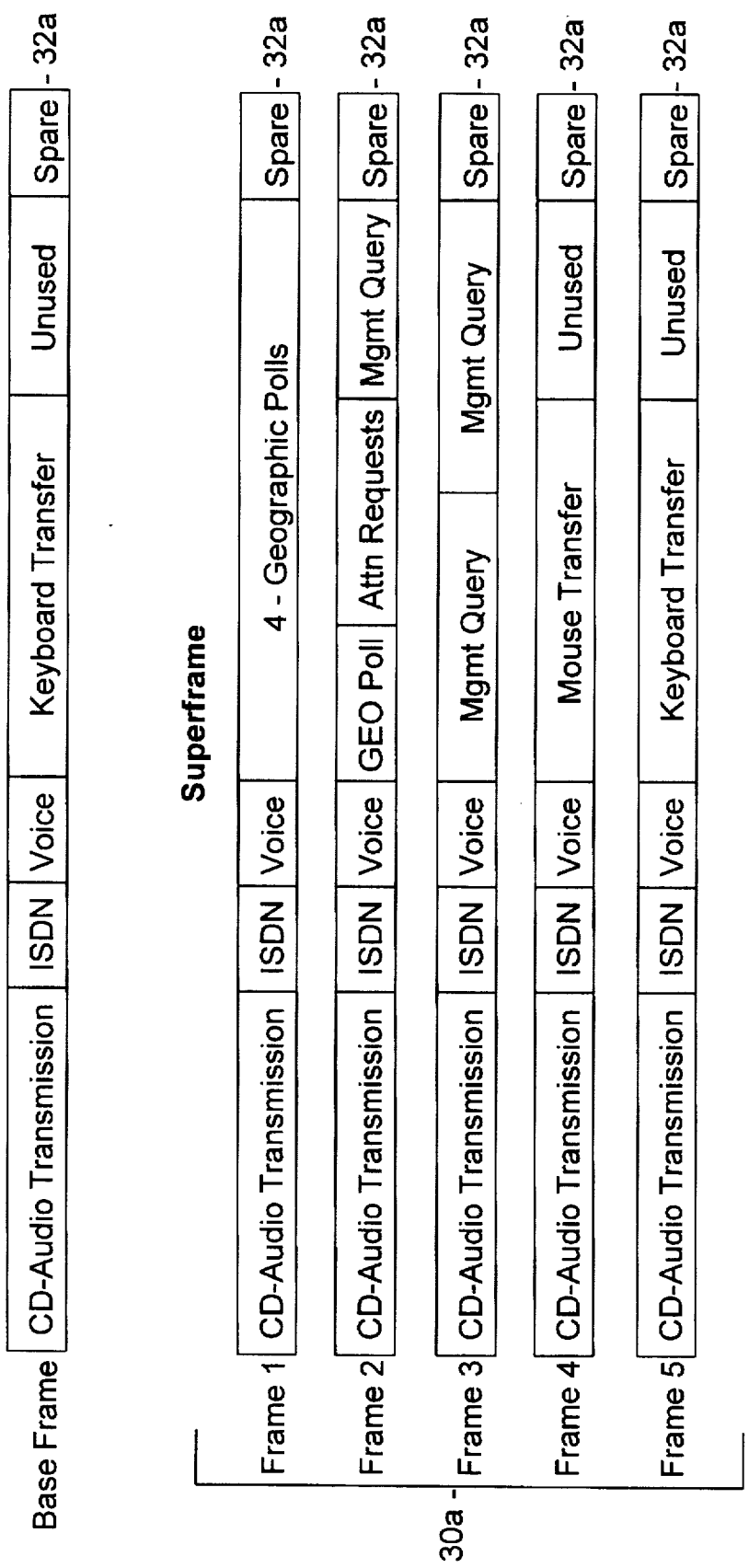

FIGS. 17a–17c illustrate an exemplary application of the lowest latency method. As shown in FIG. 17a, in this exemplary application, the bus topology includes the Host, one Hub, four Nodes having five functions. The five functions include three isochronous functions, i.e. CD, an ISDN T1 line, and a Voice channel, and two asynchronous functions, i.e. Mouse and Keyboard. Additionally, asynchronous transfers for connection management (GEO poll), attention requests and management queries also have to be accommodated. The latencies of the isochronous functions, and the transmit times of the isochronous data as well as the asynchronous transfers are summarized in table 380.

As shown in FIG. 17b, the bus controller 14 first determines the latencies of the three isochronous functions, CD, ISDN T1, and Voice to be 364us, 667us, and 727us respectively, step 302a. Thus, the lowest latency is determined to be 364us; the soft frame size is set to 364us; and the isochronous watermark is computed to be 273us (using an exemplary 75% usage rate), step 304a. The transmit times of the isochronous data and the asynchronous transfers are determined to be 114us for CD Audio, 37.2us for ISDN T1 data, 37.2us for Voice data, etc., etc., step 306a. Applying the method steps illustrated by FIGS. 15a–15c, the isochronous functions CD Audio, ISDN T1, and Voice are all successfully scheduled into a base soft frame as shown, since the cumulative transmit time of their isochronous data is 188.4us, which is less than 273us, the isochronous watermark, step 308a.

Next, the bus controller 14 determines that polling for two asynchronous functions, five connection management transactions (GEO poll), one attention request, and three management queries are required, step 310. The bus controller 14 further determines that about 130us are available per soft frame for asynchronous transfers (using an exemplary 95% usage rate), step 312a. Having determined the transmit time available per soft frame, the bus controller 14 then schedules the required asynchronous transfers using five base soft frames as shown, step 314a. The resulting polling schedule for this exemplary application is shown in FIG. 17c.

Figure 18:
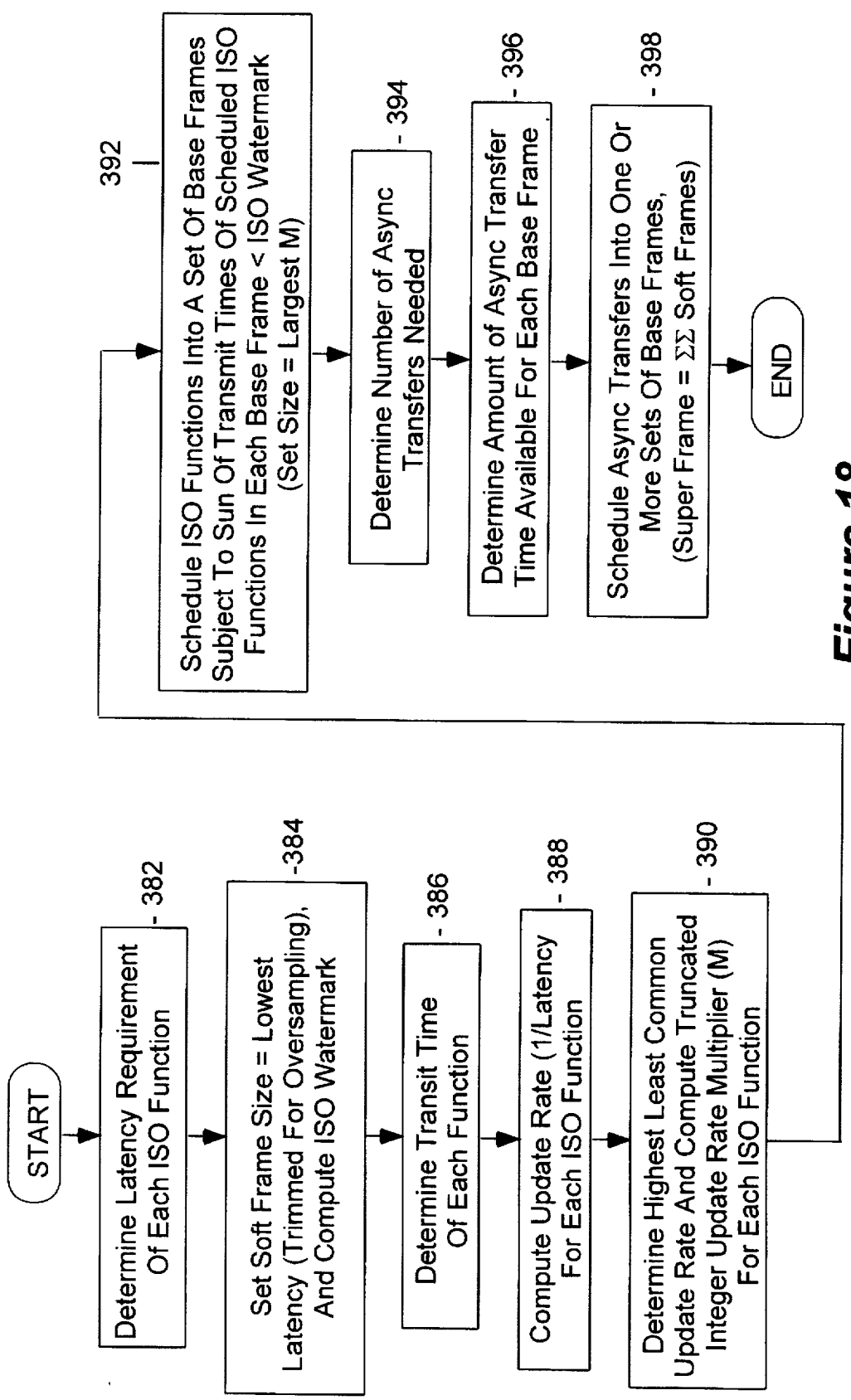
FIG. 18 illustrates the lowest latency and least common update rate method of the present invention for generating a frame based polling schedule that guaranties latencies and bandwidths of isochronous functions.

FIG. 18 illustrates the lowest latency and least common update rate method of the present invention for generating a frame based polling schedule that guaranties latencies and bandwidths of isochronous functions. The first three steps, i.e. steps 382–386 are identical to the first three steps, steps 302–306 of the lowest latency method described earlier. However, during the current method, upon performing the first three steps, the bus controller 14 further computes the update rate requirements of the isochronous functions, step 388. The update rate requirement of each isochronous function is equal to the reciprocal of its latency requirement. Next, the bus controller 14 determines the least common update rate of the isochronous functions, and compute a multiplier for each isochronous function to multiplicatively expand the isochronous function's required update rate to the least common update rate, step 390.

Having performed the additional computations, the bus controller 14 then proceeds to schedule polling of the isochronous functions, step 392. Step 392 is similar to step 308 of the lowest latency method described earlier. However, it differs from step 308 in that polling of isochronous functions are scheduled using a set of base soft flames instead of one base soft frame. The scheduling is also made using the additionally computed multipliers. Step 392 will be described in more detail below with additional references to FIGS. 19a–19c.

After having scheduled the isochronous functions, the bus controller 14 proceeds with steps 394 and 396, which are similar to steps 310 and 312 of the lowest latency method described earlier. However, step 396 differs from step 312 in that the bus controller 14 determines the amount of transmit time available in each base soft frame of the set of base soft frames, instead of just one base soft frame. Having determined the asynchronous transfer requirements, and the transmit time available in each of the base soft flames, the bus controller 14 then schedules the asynchronous transfers, step 398. Step 398 is also similar to step 314 of the lowest latency method described earlier. However, it differs from step 314 in that the asynchronous transfers are scheduled using multiple sets of soft frames, instead of multiple soft frames. Step 398 will be described in more detail below with additional references to FIGS. 20.

In some embodiments, the above described process is also repeated upon detection of live attachment/detachment of serial bus elements, thereby dynamically adapting in real time the frame based polling schedule to the serial bus elements actually present. The manner in which step 392 is performed is slightly different when the process is repeated in response to detection of live attachment/detachment of serial bus elements. These differences will be noted when step 392 is described in more detail below.

Figure 19A:
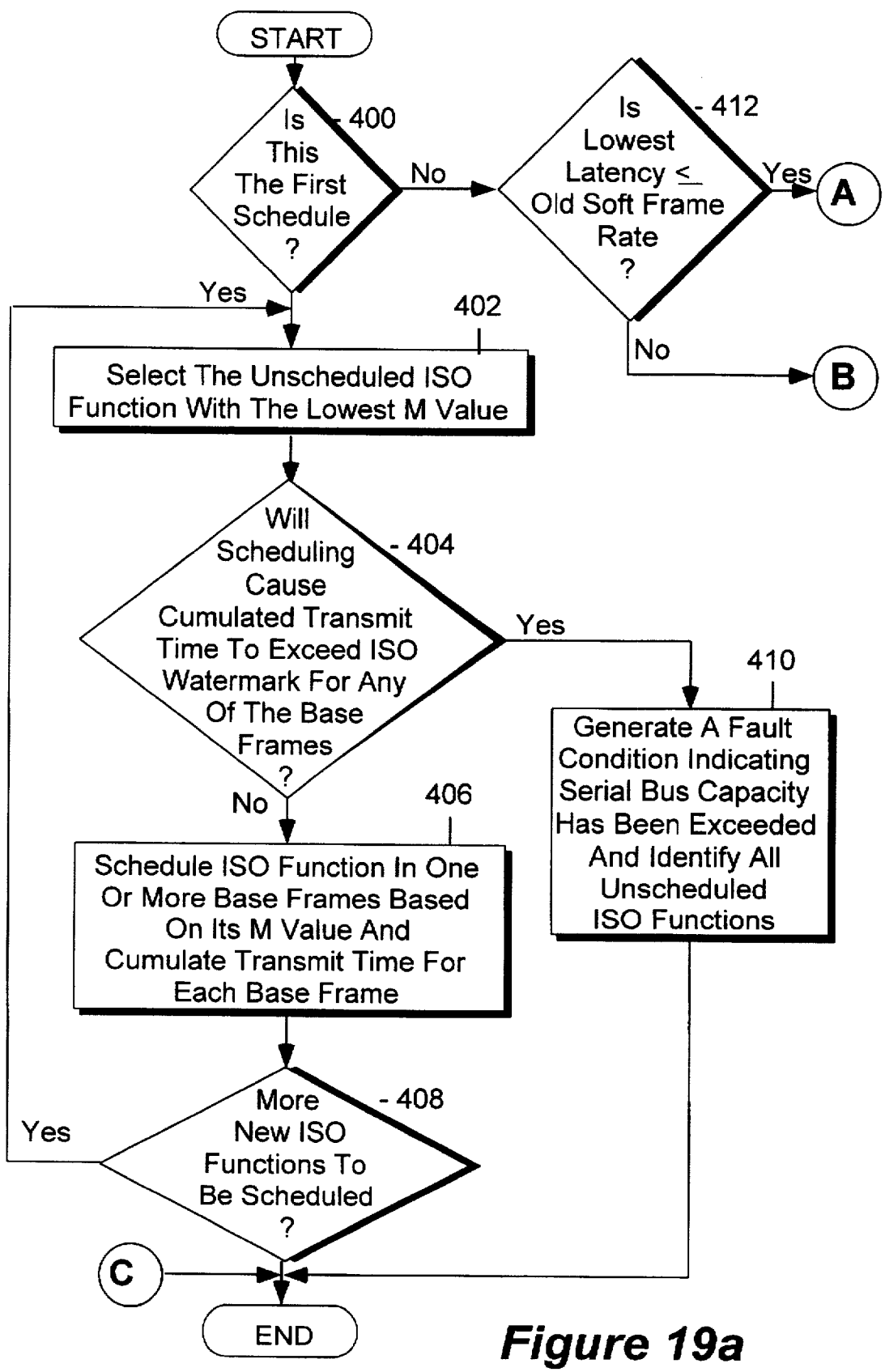
FIGS. 19a–19c illustrate the method steps of the present invention for scheduling polling of isochronous functions in a set of soft frames under the lowest latency and least common update rate method.
Figure 19B:
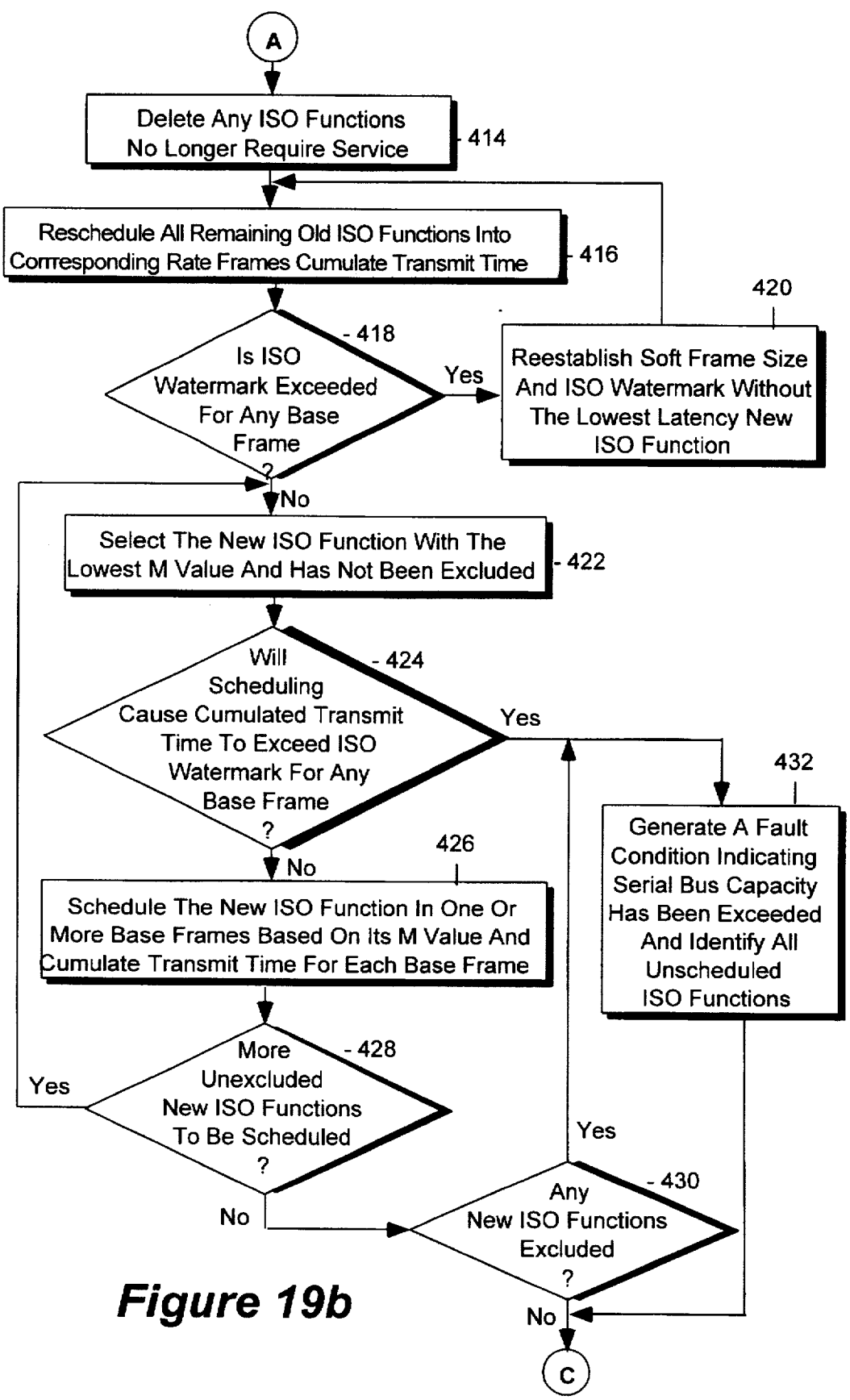
Figure 19C:
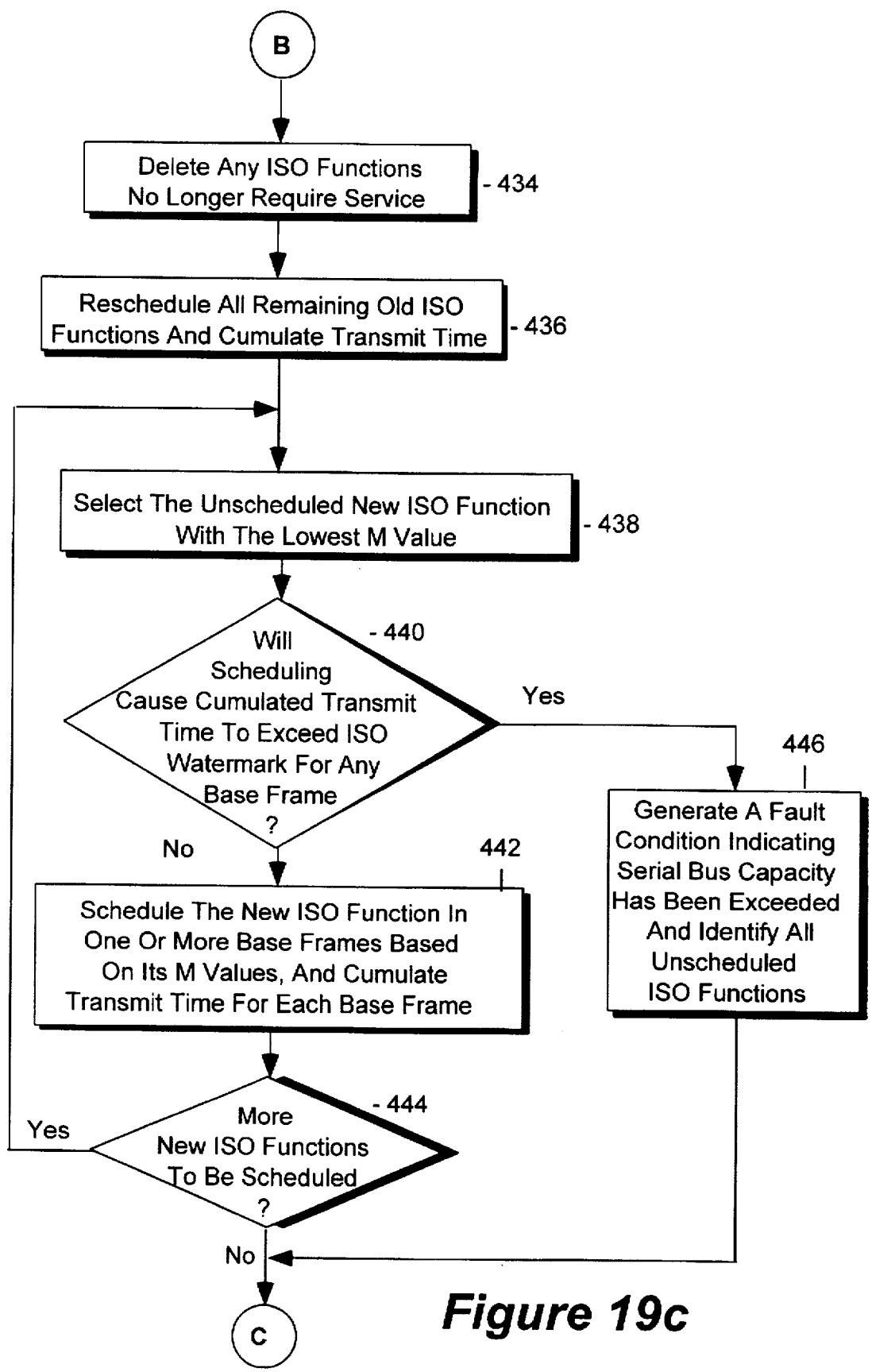

FIGS. 19a–19c illustrate the method steps of the present invention for scheduling polling of isochronous functions in a set of soft flames under the lowest latency and least common update rate method. Similar to the lowest latency method, initially, the bus controller 14 determines whether it is generating the first polling schedule, step 400, i.e. whether it is scheduling at power on/reset or in response to live attachment/detachment of serial bus elements. If the scheduling is being performed for the first schedule, the bus controller 14 immediately proceeds to select one of the isochronous functions for scheduling, step 403. However, unlike the lowest latency method, selection is based on the computed multiplier values of the isochronous functions. More specifically, the unscheduled isochronous function with the lowest truncated multiplier value is selected. Next, the bus controller 14 determines if scheduling the selected isochronous function will cause the cumulative transmit time of the scheduled isochronous functions of each base soft frame of a set of soft frames to exceed its isochronous watermark, step 404. The set size is equal to the largest truncated multiplier value of the isochronous functions. If scheduling would not cause the cumulative transmit time to exceed the isochronous watermark for any base soft frame, the bus controller 14 schedules the isochronous function in accordance to its truncated multiplier value, and adds the transmit time of its isochronous data into the cumulative transmit time of schedule isochronous functions for each base soft frame, step 406.

Upon scheduling the isochronous function, similar to the lowest latency method described earlier, the bus controller 1t checks to determine if there are additional polling of isochronous functions that need to be scheduled, step 408. If additional polling of isochronous functions need to be scheduled, the bus controller 14 returns to step 402, otherwise, scheduling of isochronous functions is completed.

Whenever the bus controller 14 determines at step 404 that scheduling of a selected isochronous function would cause the cumulated transmit time of scheduled isochronous functions to exceed the isochronous watermark, also similar to the lowest latency method described earlier, the bus controller 14 rejects the selected isochronous function and terminates scheduling, step 410. Preferably, the bus controller 14 will also generate a fault condition indicating that bus capacity has been exceeded, and identifies all unscheduled isochronous functions, step 410.

Back at step 400, similar to the lowest latency method described earlier, if the bus controller 14 determines that the process is not being performed to generate the first polling schedule, i.e. it is being performed to dynamically adapt the polling schedule, the bus controller 14 further determines if the lowest latency is less than or equal to the "old" soft frame size, step 412. If the lowest latency is less than or equal to the "old" soft frame size, the bus controller 14 proceeds to step 414, otherwise it proceeds with step 434.

Continuing now with FIG. 19b, similar to the lowest latency method described earlier, at step 414, the bus controller 14 deletes any isochronous functions no longer require service from the polling schedule. The bus controller 14 then reschedules all the remaining "old" isochronous functions into the base soft frames and cumulates their transmit times for all base soft frames as described earlier, step 416. Next the bus controller 14 determines if any of the isochronous watermarks of the base soft frames have been exceeded or not, step 418. If the isochronous watermark of at least one base soft frame has been exceeded, the bus controller 14 reestablishes the soft frame size for the base soft frames and the corresponding isochronous watermarks, excluding the isochronous function that yielded the lowest latency, step 420. The bus controller 14 repeats steps 416–420 until it can determine at step 418 that all remaining old isochronous functions have been rescheduled successfully under the isochronous watermarks of all base soft frames.

The bus controller 14 then proceeds to steps 422–432. Similar to the lowest latency method described earlier, except for step 430, steps 422–432 are identical to the steps 404–410 described earlier. Extra step 430 is performed to cause the fault condition in step 432 to be also generated in the event that the "successful" adaptation of the polling schedule required exclusion of one or more new isochronous functions with low latencies earlier at step 420 to yield the eventual "successful" soft frame size for the base soft frames Continuing now with FIG. 19c, recall that the bus controller 14 proceeds with step 434 if it decided back at step 412 the lowest latency is greater than the "old" soft frame size. Steps 434 and 436 are the same as steps 414 and 416 described earlier. However, upon rescheduling the old isochronous functions in step 436, steps similar to steps 418 and 420 described earlier are not necessary, since the lowest latency was determined to be greater than the "old" soft frame size back at step 412. Thus, it is not possible for the bus controller 14 to fail to schedule the old isochronous functions under the isochronous watermarks of the base soft frames. The bus controller 14 than proceeds to schedule the new isochronous functions in steps 440–446. Steps 440–446 are identical to steps 404–410 described earlier.

Figure 20:
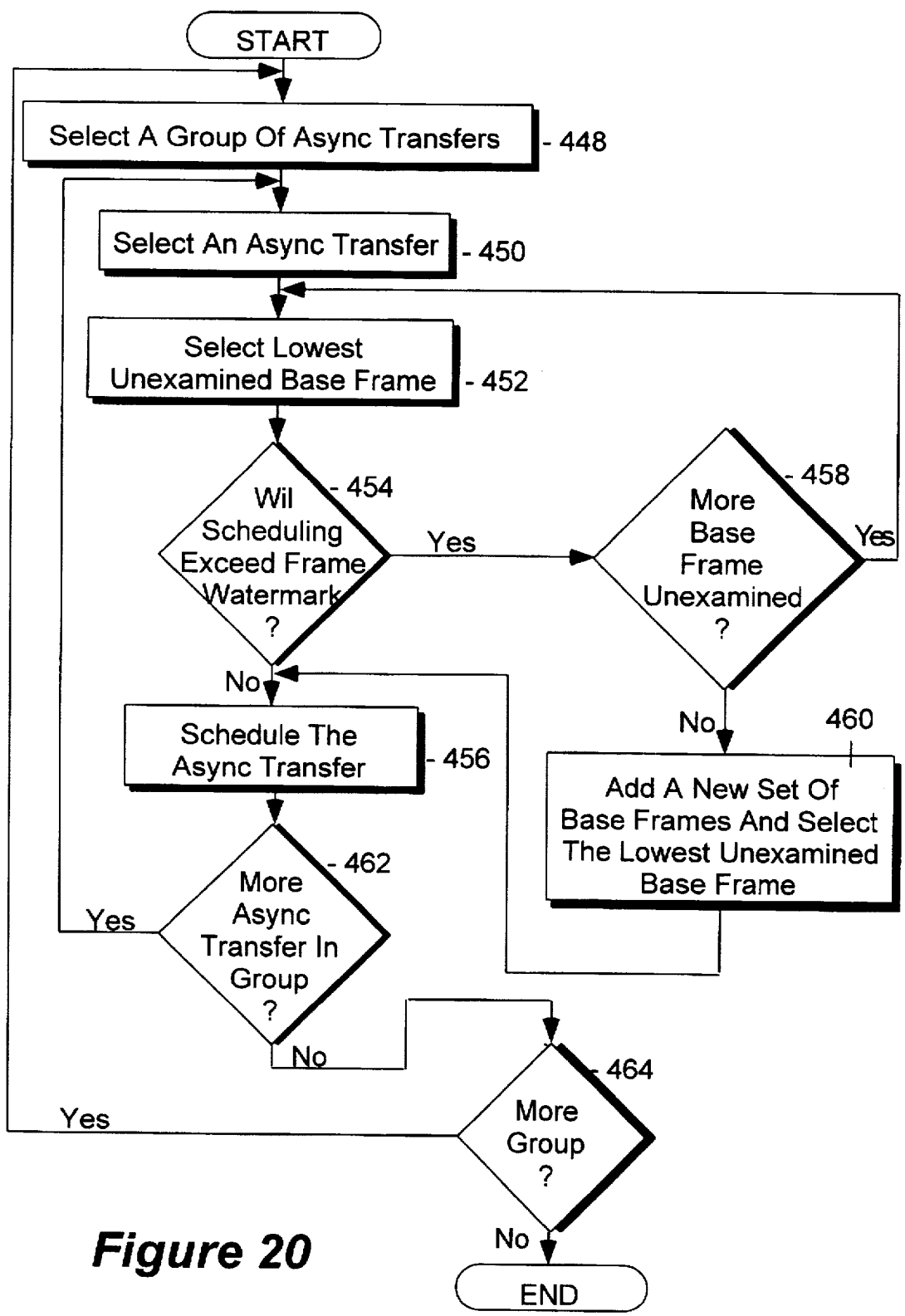
FIG. 20 illustrates the method steps of the present invention for scheduling polling of asynchronous transfers in one or more sets of soft frames under the lowest latency and least common update rate method.

FIG. 20 illustrates the method steps of the present invention for scheduling polling of asynchronous transfers in one or more sets of soft frames under the lowest latency and least common update rate method. In this illustrated embodiment, polling of asynchronous transfers are also scheduled by groups. As described earlier, particular examples of asynchronous transfer groups include attention requests, management queries, and the like. However, it will be appreciated that present invention may be practiced without having the scheduling of asynchronous transfers being performed by groups.

Under the illustrated embodiment, similar to the embodiment of the lowest latency method described earlier, the bus controller 14 first selects a particular asynchronous transfer group for scheduling, step 448. Then, the bus controller 14 selects an asynchronous transfer for scheduling, step 450. Either selection may be made in an arbitrary manner or using some priority schemes. Upon selecting an asynchronous transfer for scheduling, the bus controller 14 selects the "lowest" unexamined base soft frame, step 452. The bus controller 14 determines if scheduling the selected asynchronous transfer would cause the cumulative transmit time of all scheduled functions/transfers to exceed the frame watermark of the selected base soft frame, step 454. If scheduling would not cause the frame watermark of the selected base soft frame to be exceeded, the bus controller 14 schedules the selected asynchronous transfer, step 456. On the other hand, if scheduling would cause the frame watermark of the selected base soft frame to be exceeded, the bus controller 14 determines if there are base soft frames remain unexamined, step 458. If there are base soft frames unexamined, the bus controller 14 returns to step 452. However, if all base soft frames have been examined, the bus controller 14 adds another set of base soft frames, i.e. a new set of soft flames with similarly scheduled isochronous functions, step 460, before scheduling the selected asynchronous transfer, step 456.

Upon scheduling the selected asynchronous transfer, similar to the embodiment of the lowest latency method described earlier, the bus controller 14 determines if more asynchronous transfers are still to be scheduled within the selected asynchronous transfer group, step 462. If more asynchronous transfers are still to be scheduled, the bus controller 14 repeats steps 450–460, until it is determined at step 462 that all asynchronous transfers within the selected asynchronous transfer group have been scheduled. The bus controller 14 then determines if more asynchronous transfer groups are still to be scheduled, step 464. If more asynchronous transfer groups are still to be scheduled, the bus controller 14 repeats steps 448–462, until it is determined at step 464 that all asynchronous transfer groups have been scheduled.

Figure 21A:
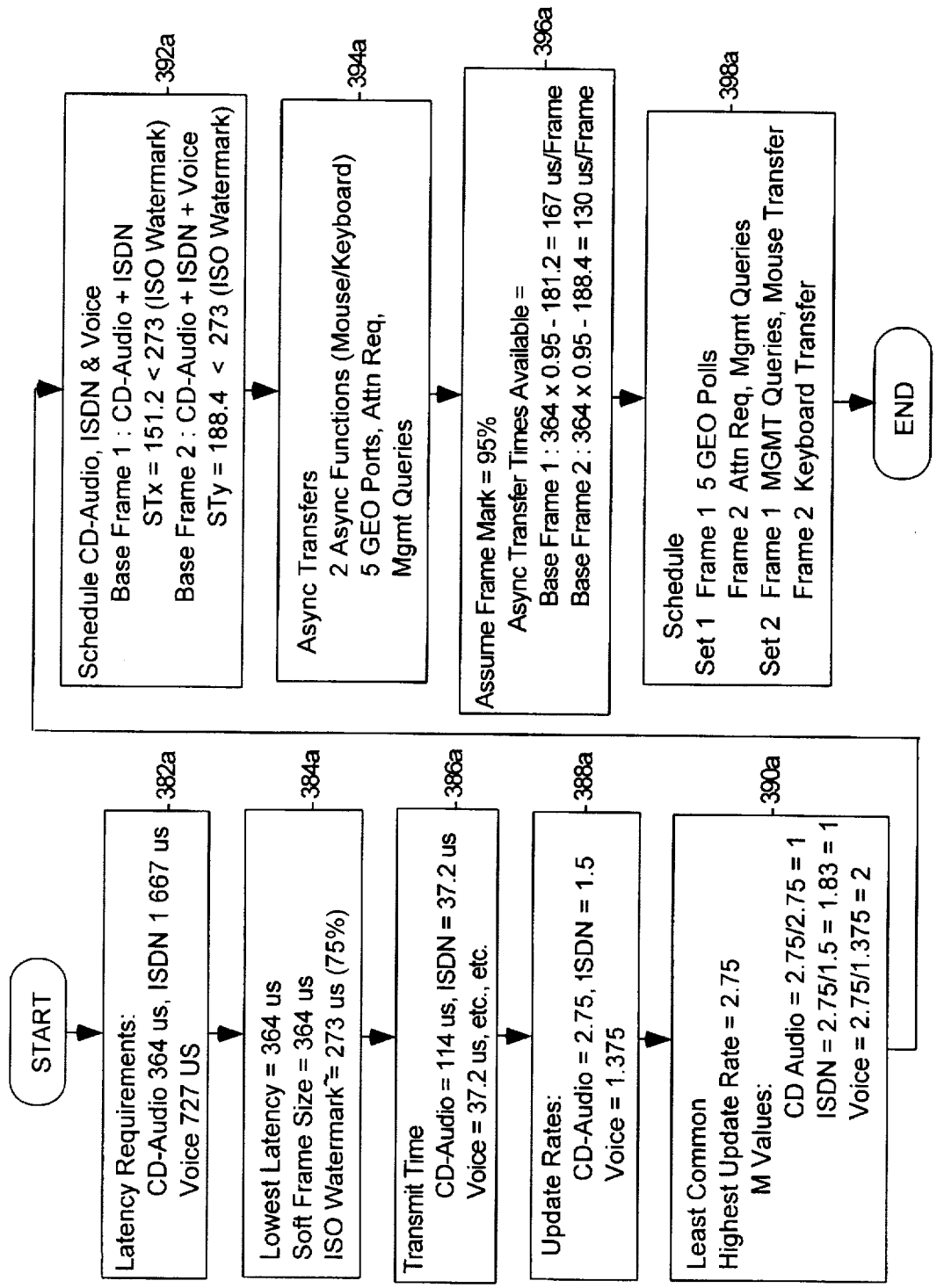
FIGS. 21a–21b illustrate an exemplary application of the lowest latency and least common update rate method.
Figure 21B:
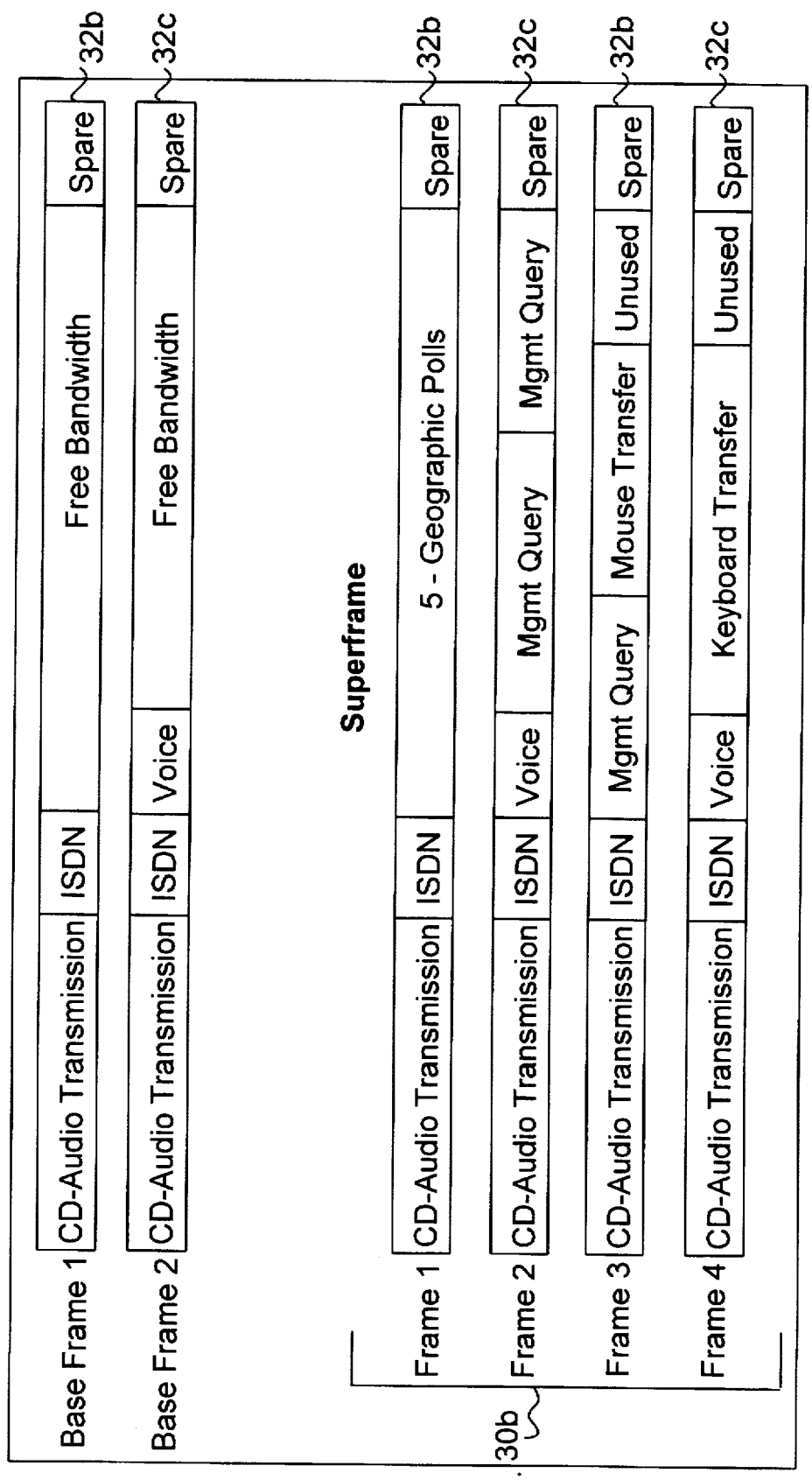

FIGS. 21a–21b illustrate an exemplary application of the lowest latency and least common update rate method, using the same topology and isochronous/asynchronous transfer requirements illustrated in FIG. 17a. As shown in FIG. 21a, the bus controller 14 first determines the latencies of the three isochronous functions, CD, ISDN T1, and Voice to be 364us, 667us, and 727us respectively, step 382a. Thus, the lowest latency is determined to be 364us; the soft frame size is set to 364us; and the isochronous watermark is computed to be 273us (using an exemplary 75% usage rate), step 384a. The transmit times of the isochronous data and the asynchronous transfers are determined to be 114us for CD Audio, 37.2us for ISDN T1 data, 37.2us for Voice data, etc., etc., step 386a. The update rates of isochronous functions are determined to be 2.75 for CD Audio, 1.5 for ISDN T1, and 1.375 for Voice date, step 388a. The least common update rate is determined to be 2.75, and the truncated multiplier values of the isochronous functions are determined to be 1 for CD Audio, 1 for ISDN T1, and 2 for Voice respectively, step 390a.

Applying the method steps illustrated by FIGS. 19a–19c, the isochronous functions CD Audio, ISDN T1, and Voice are all successfully scheduled into a set of two base soft frames as shown, since the cumulative transmit times of the isochronous data for the two base soft frames are 151.2us and 188.4us, which are less than 273us, the common isochronous watermark for both base soft frames, step 392a.

Next, the bus controller 14 determines polling for two asynchronous functions, five connection management transactions (GEO poll), one attention request, and three management queries are required, step 394a. The bus controller 14 further determines that about 167us and 130us are available for the two base soft frames respective for asynchronous transfers (using an exemplary 95% usage rate), step 396a. Having determined the transmit times available for the base soft frames, the bus controller 14 then schedules the required asynchronous transfers using two sets of base soft frames as shown, step 398a. The resulting polling schedule for this exemplary application is shown in FIG. 21b.

Thus, methods and apparatus for dynamically generating and maintaining frame based polling schedules for polling isochronous and asynchronous functions that guaranty latencies and bandwidths to the isochronous functions have been described. For additional information about the method and apparatus of the present invention, refer to the enclosed Appendices.

While the present invention has been described in terms of the above embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. An apparatus for generating and maintaining frame based polling schedules that guaranty latencies and bandwidths to isochronous functions of isochronous peripherals coupled to a system unit of a computer system, along with asynchronous peripherals, said apparatus comprising:

first means for conducting a plurality of configuration management transactions between the system unit and the peripherals, isochronous as well as asynchronous, to dynamically determine a plurality of operating characteristics for each of the peripherals, including latency requirement of the isochronous functions and transmit times of isochronous data, as well as transactional requirements of the asynchronous peripherals and transmit times of transactions;

second means for generating and maintaining a polling schedule for the system unit to poll the peripherals, the polling schedule being generated and maintained in accordance with the determined operating characteristics, and consisting of a superframe having a plurality of soft frames that are replications of one or more base frames, wherein polling of each of the isochronous functions is scheduled in multiple ones of the soft frames by virtue of said replications and scheduling polling of the isochronous function in at least one of the one or more base frames, and polling of each of the asynchronous peripherals is scheduled in at most one of the soft frames.

2. The apparatus as set forth in claim 1, wherein said first means comprises:

first circuitry and complementary logic disposed on said system unit for polling said isochronous and said asynchronous peripherals to provide said latency requirements of the isochronous functions and said transmit times of isochronous data, as well as said transactional requirements of the asynchronous peripherals and said transmit times of transactions.

3. The apparatus as set forth in claim 1, wherein said second means comprises:

first circuitry and complementary logic disposed on said system unit for determining an isochronous watermark for a base frame, delimiting a first upper limit within the base frame for scheduling polling of isochronous functions.

4. The apparatus as set forth in claim 3, wherein, said second means further comprises:

second circuitry and complementary logic for scheduling polling of isochronous functions in the base frame, for data communication transactions, subject to a first constraint that cumulative transmit times of the scheduled isochronous functions' isochronous data being less than the isochronous watermark.

5. The apparatus as set forth in claim 4, wherein, said first circuitry and complementary logic is further used for determining a frame watermark for each of the soft frames for delimiting a second upper limit within each of the soft frames for scheduling polling; and said second circuitry and complementary logic is further used for scheduling polling of said isochronous peripherals for connection management transactions, around said scheduled polling of said isochronous functions for data communication transactions, subject to a second constraint that cumulative transmit times of the scheduled isochronous functions' isochronous data and the scheduled isochronous peripherals' connection management transactions being less than the frame watermark for each soft frame, said second circuitry and complementary logic replicating said one or more base frames to schedule said polling for connection management transactions, if necessary.

6. The apparatus as set forth in claim 3, wherein, said second means further comprises:

second circuitry and complementary logic for determining a least common update rate required by said isochronous functions based on the isochronous functions' respective update rates required which are computed from said latency requirements, determining a plurality of truncated integer multipliers, one for each isochronous function, based on said least common update rate and said update rates required by said isochronous functions, and scheduling polling of selected ones of said isochronous functions in the base frame in accordance with said truncated integer multipliers, for data communication transactions, subject to a first constraint that cumulative transmit times of the scheduled isochronous functions' isochronous data being less than the isochronous watermark for the base frame.

7. The apparatus as set forth in claim 6, wherein, said first circuitry and complementary logic is further used for determining a frame watermark for each of the soft frames, for delimiting a second upper limit within each of the soft frames for scheduling polling; and said second circuitry and complementary logic is further used for scheduling polling of said isochronous peripherals for connection management transactions, around said scheduled polling of said isochronous functions for data communication transactions, subject to a second constraint that cumulative transmit times of the scheduled isochronous functions' isochronous data and the scheduled isochronous peripherals' transactions being less than the frame watermark for each of the soft frames, said second circuitry and complementary logic replicating the one or more base frames to schedule said polling for connection management transactions, if necessary.

8. The apparatus as set forth in claim 6, wherein, said second circuitry and complementary logic is further used for scheduling polling of said asynchronous peripherals for asynchronous and connection management transactions, around said scheduled polling of said isochronous functions for data communication transactions, subject to a second constraint that cumulative transmit times of said scheduled isochronous functions' isochronous data and said scheduled asynchronous peripherals' transaction being less than said frame watermark for each of the soft frames, said second circuitry and complementary logic replicating the base frames to schedule said polling of said asynchronous peripherals for asynchronous and connection management transactions, if necessary.

9. The apparatus as set forth in claim 2, wherein said first circuitry and complementary logic disposed on said system unit polls said isochronous and said asynchronous peripherals for said latency requirements of isochronous functions and transmit times of isochronous data, and said transaction requirements of said asynchronous peripherals and transmit times of transactions respectively, at power on and reset.

10. The apparatus as set forth in claim 9, wherein said first circuitry and complementary logic disposed on said system unit further periodically polls said isochronous and said asynchronous peripherals during operation, for said latency requirements of isochronous functions and transmit times of isochronous data, and said transactional requirements of said asynchronous peripherals and said transmit times of transactions respectively.

11. In a computer system comprising a system unit, a plurality of isochronous peripherals and a plurality of asynchronous peripherals, wherein the peripherals, both isochronous as well as asynchronous, are coupled to the system unit, a method for generating and maintaining frame based polling schedules that guaranty latencies and bandwidths to isochronous functions of the isochronous peripherals, the method comprising the steps of:

a) conducting a plurality of configuration management transactions between the system unit and the peripherals, synchronous as well as asynchronous, to dynamically determine a plurality of operating characteristics for each of the peripherals, including latency requirement of the isochronous functions and transmit time of isochronous data, as well as transactional requirements for the asynchronous peripherals and transmit times for transactions; and b) generating and maintaining a polling schedule for the system unit to poll the peripherals, the polling schedule being generated and maintained in accordance with the determined operating characteristics, and consisting of a superframe having a plurality of soft frames that are replications of one or more base frames, wherein polling of each of the isochronous functions is scheduled in multiple ones of the soft frames by virtue of said replications and scheduling polling of each of the isochronous functions in at least one of the one or more base frames, and polling of each of the asynchronous peripherals is scheduled in at most one of the soft frames.

12. The method as set forth in claim 11, wherein step (a) is performed at power on and reset.

13. The method as set forth in claim 12, wherein step (a) is further performed periodically during operation.

14. The method as set forth in claim 11, wherein step (b) comprises determining an isochronous watermark for a base frame, for delimiting a first upper limit within the base frame for scheduling polling of isochronous functions.

15. The method as set forth in claim 14, wherein, step (b) further comprises scheduling polling of isochronous functions in the base frame, for data communication transactions, subject to a first constraint that cumulative transmit times of the scheduled isochronous functions' isochronous data being less than the isochronous watermark.

16. The method as set forth in claim 15, wherein, said step (b) further comprises:

determining a frame watermark for each of the soft frames, for delimiting a second upper limit within each of the soft frames for scheduling polling; and scheduling polling of said isochronous peripherals for connection management transactions, around said scheduled polling of said isochronous functions for data communication transactions, subject to a second constraint that cumulative transmit times of the scheduled isochronous functions' isochronous data and schedule isochronous peripherals' transactions being less than the frame watermark for each soft frame, replicating said one or more base soft frames to schedule said polling for connection management transactions, if necessary.

17. The method as set forth in claim 15, wherein, step (b) further comprises determining a frame watermark for each of the soft frames for delimiting a second upper limit within each of the soft frames for scheduling polling, and scheduling polling of said asynchronous peripherals for asynchronous and connection management transactions, around said scheduled polling of said isochronous functions for data communication transactions, subject to a second constraint that cumulative transmit times of the scheduled isochronous functions' isochronous data and the scheduled asynchronous peripherals' transactions being less than the frame watermark of each soft frame, replicating said one or more base frames to schedule said polling of said asynchronous peripherals for asynchronous and connection management transactions, if necessary.

18. The method as set forth in claim 14, wherein, step (b) further comprises determining a least common update rate required by said isochronous functions based on their respective update rates required which are computed from said latency requirements, determining a plurality of truncated integer multipliers, one for each isochronous function, based on said least common update rate and said update rates required by said isochronous functions, and scheduling polling of said isochronous functions in the base soft frame and in accordance with said truncated integer multipliers, for data communication transactions, subject to a first constraint that cumulative transmit times of the scheduled isochronous functions' isochronous data being less than the isochronous watermark for the base frame.

19. The method as set forth in claim 18, wherein, step (b) further comprises determining a frame watermark for each of the soft frames, for delimiting a second upper limit within each of the soft frames for scheduling polling; and scheduling polling of said isochronous peripherals for connection management transactions, around said scheduled polling of said isochronous functions for data communication transactions, subject to a second constraint that cumulative transmit times of the scheduled isochronous functions' isochronous data and the scheduled isochronous peripherals' transactions of each soft frame being less than the frame watermark, replicating said one or more base frames to schedule said polling for connection management transactions, if necessary.

20. The method as set forth in claim 18, wherein, step (b) further comprises determining a frame watermark for each of the soft frames, for delimiting a second upper limit within each of the soft frames for scheduling polling, and scheduling polling of said asynchronous peripherals for asynchronous and connection management transactions, around said scheduled polling of said isochronous functions for data communication transactions, subject to a second constraint that cumulative transmit time of the scheduled isochronous functions' isochronous data and the scheduled asynchronous peripherals' transaction for each soft frame being less than the frame watermark, replicating said one or more base frames to schedule said polling of said asynchronous peripherals for asynchronous and connection management transactions, if necessary.

* * * * *